(12) United States Patent
Baumgartner et al.

(10) Patent No.: US 8,893,194 B2
(45) Date of Patent: Nov. 18, 2014

(54) PERSONAL VIDEO RECORDER SYSTEMS AND METHODS

(75) Inventors: Joseph P. Baumgartner, Tulsa, OK (US); Kenneth F. Carpenter, Jr., Mount Laurel, NJ (US); Michael D. Ellis, Boulder, CO (US); Danny R. Gaydou, Tulsa, OK (US)

(73) Assignee: United Video Properties, Inc., Santa Clara, CA (US)

( * ) Notice: Subject to any disclaimer, the term of this patent is extended or adjusted under 35 U.S.C. 154(b) by 582 days.

(21) Appl. No.: 12/818,863

(22) Filed: Jun. 18, 2010

(65) Prior Publication Data
US 2010/0310227 A1     Dec. 9, 2010

Related U.S. Application Data

(62) Division of application No. 10/105,082, filed on Mar. 21, 2002, now Pat. No. 8,156,528.

(60) Provisional application No. 60/290,714, filed on May 14, 2001, provisional application No. 60/284,951, filed on Apr. 19, 2001, provisional application No. 60/278,079, filed on Mar. 22, 2001.

(51) Int. Cl.
*H04N 7/18* (2006.01)
*H04N 5/76* (2006.01)
(Continued)

(52) U.S. Cl.
CPC ............. *H04N 21/4147* (2013.01); *H04N 5/76* (2013.01); *H04N 5/775* (2013.01); *H04N*
(Continued)

(58) Field of Classification Search
USPC ............. 725/74–85, 100, 131–134, 139–142, 725/151–153; 386/200; 709/217–232
See application file for complete search history.

(56) References Cited

U.S. PATENT DOCUMENTS

| 4,264,924 A | 4/1981 | Freeman |
| 4,264,925 A | 4/1981 | Freeman et al. |

(Continued)

FOREIGN PATENT DOCUMENTS

| EP | 0 682 452 | 11/1995 |
| EP | 0 753 964 A1 | 1/1997 |

(Continued)

OTHER PUBLICATIONS

"Advanced Analog Systems—Addressable Terminals" General Instrument Corp. of Horsham, Pennsylvania (URL:http--www.gi.com-BUSAREA-ANALOG-TERMINAL-WATCH-watch.html) Printed from the Internet on Mar. 4, 1999.

(Continued)

*Primary Examiner* — Annan Shang
(74) *Attorney, Agent, or Firm* — Ropes & Gray LLP

(57) ABSTRACT

Systems and methods are disclosed for providing an interactive television system for recording television programming. The interactive television system may include components for providing personal video recorder (PVR) functionality, such as an interactive television program guide (IPG), PVR extensions, PVR application programming interfaces (APIs), a PVR device, any suitable hardware or software, or a combination thereof. These components may be implemented in, for example, an arrangement having an integrated PVR-compliant device with a PVR device, or in an arrangement having a PVR-compliant device (e.g., a set-top box) coupled to PVR equipment (e.g., a remote PVR server or a PVR sidecar) with a PVR device. The PVR-compliant device may include software and hardware configured to implement the IPG. The PVR APIs may be a library of intelligent vendor-specific and vendor-independent APIs able to determine the type of PVR device being used. The PVR extensions and PVR APIs may be configured to provide a seamless integration of functionality associated with the PVR-compliant device and the PVR device. A full port of the IPG may be implemented in both the PVR-compliant device and the PVR device.

13 Claims, 30 Drawing Sheets

(51) Int. Cl.
*H04N 21/4147* (2011.01)
*H04N 21/443* (2011.01)
*H04N 21/436* (2011.01)
*H04N 21/442* (2011.01)
*H04N 5/775* (2006.01)
*H04N 5/782* (2006.01)
*H04N 5/765* (2006.01)

(52) U.S. Cl.
CPC ....... 21/443 (2013.01); *H04N 5/782* (2013.01); *H04N 5/765* (2013.01); *H04N 21/43622* (2013.01); *H04N 21/4424* (2013.01)
USPC .............................. 725/80; 725/133; 709/231

(56) References Cited

U.S. PATENT DOCUMENTS

| | | |
|---|---|---|
| 4,573,072 A | 2/1986 | Freeman |
| 4,602,279 A | 7/1986 | Freeman |
| 4,706,121 A | 11/1987 | Young |
| 4,847,698 A | 7/1989 | Freeman |
| 4,847,700 A | 7/1989 | Freeman |
| 4,908,707 A | 3/1990 | Kinghorn |
| 4,945,563 A | 7/1990 | Horton et al. |
| 4,977,455 A | 12/1990 | Young |
| 5,038,211 A | 8/1991 | Hallenbeck |
| 5,047,867 A | 9/1991 | Strubbe et al. |
| 5,068,733 A | 11/1991 | Bennett |
| 5,151,789 A | 9/1992 | Young |
| 5,187,589 A | 2/1993 | Kono et al. |
| 5,195,134 A | 3/1993 | Inoue |
| 5,210,611 A | 5/1993 | Yee et al. |
| 5,223,924 A | 6/1993 | Strubbe |
| RE34,340 E | 8/1993 | Freeman |
| 5,253,066 A | 10/1993 | Vogel |
| 5,285,284 A | 2/1994 | Takashima et al. |
| 5,296,931 A | 3/1994 | Na |
| 5,323,234 A | 6/1994 | Kawasaki |
| 5,353,121 A | 10/1994 | Young et al. |
| 5,410,343 A | 4/1995 | Coddington et al. |
| 5,410,344 A | 4/1995 | Graves et al. |
| 5,416,508 A | 5/1995 | Sakuma et al. |
| 5,459,522 A | 10/1995 | Pint |
| 5,475,615 A | 12/1995 | Lin |
| 5,479,266 A | 12/1995 | Young et al. |
| 5,479,268 A | 12/1995 | Young et al. |
| 5,483,278 A | 1/1996 | Strubbe et al. |
| 5,485,197 A | 1/1996 | Hoarty |
| 5,485,219 A | 1/1996 | Woo |
| 5,508,732 A | 4/1996 | Bottomley et al. |
| 5,515,511 A | 5/1996 | Nguyen et al. |
| 5,528,281 A | 6/1996 | Grady et al. |
| 5,532,754 A | 7/1996 | Young et al. |
| 5,534,911 A | 7/1996 | Levitan |
| 5,537,141 A | 7/1996 | Harper et al. |
| 5,539,822 A | 7/1996 | Lett |
| 5,541,738 A | 7/1996 | Mankovitz |
| 5,550,576 A | 8/1996 | Klosterman |
| 5,559,548 A | 9/1996 | Davis et al. |
| 5,559,549 A | 9/1996 | Hendricks et al. |
| 5,568,272 A | 10/1996 | Levine |
| 5,581,800 A | 12/1996 | Fardeau et al. |
| 5,585,838 A | 12/1996 | Lawler et al. |
| 5,585,858 A | 12/1996 | Harper et al. |
| 5,589,892 A | 12/1996 | Knee et al. |
| 5,592,571 A | 1/1997 | Peters |
| 5,600,364 A | 2/1997 | Hendricks et al. |
| 5,612,729 A | 3/1997 | Ellis et al. |
| 5,619,274 A | 4/1997 | Roop et al. |
| 5,629,733 A | 5/1997 | Youman et al. |
| 5,631,995 A | 5/1997 | Weissensteiner et al. |
| 5,632,007 A | 5/1997 | Freeman |
| 5,636,139 A * | 6/1997 | McLaughlin et al. ........ 709/219 |
| 5,657,414 A | 8/1997 | Lett et al. |
| 5,684,525 A | 11/1997 | Klosterman |
| 5,694,381 A | 12/1997 | Sako |
| 5,699,107 A | 12/1997 | Lawler et al. |
| 5,724,091 A | 3/1998 | Freeman et al. |
| 5,727,060 A | 3/1998 | Young |
| 5,758,257 A | 5/1998 | Herz et al. |
| 5,790,198 A | 8/1998 | Roop et al. |
| 5,790,202 A | 8/1998 | Kummer et al. |
| 5,801,787 A | 9/1998 | Schein et al. |
| 5,805,763 A | 9/1998 | Lawler et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,812,937 A | 9/1998 | Takashima et al. |
| 5,819,156 A | 10/1998 | Belmont |
| 5,828,945 A | 10/1998 | Klosterman |
| 5,838,314 A | 11/1998 | Neel et al. |
| 5,850,218 A | 12/1998 | LaJoie et al. |
| 5,886,732 A | 3/1999 | Humpleman |
| 5,940,572 A | 8/1999 | Balaban et al. |
| 5,956,716 A | 9/1999 | Kenner et al. |
| 5,959,592 A | 9/1999 | Petruzzelli |
| 5,963,264 A | 10/1999 | Jackson |
| 5,977,964 A | 11/1999 | Williams et al. |
| 6,057,874 A | 5/2000 | Michaud |
| 6,057,890 A | 5/2000 | Virden et al. |
| 6,072,983 A | 6/2000 | Klosterman |
| 6,133,910 A | 10/2000 | Stinebruner |
| 6,141,488 A | 10/2000 | Knudson et al. |
| 6,157,413 A | 12/2000 | Hanafee et al. |
| 6,163,316 A | 12/2000 | Killian |
| 6,177,931 B1 | 1/2001 | Alexander et al. |
| 6,208,799 B1 | 3/2001 | Marsh et al. |
| 6,233,389 B1 | 5/2001 | Barton et al. |
| 6,256,390 B1 | 7/2001 | Okuyama et al. |
| 6,272,530 B1 * | 8/2001 | Horiuchi et al. ............... 709/206 |
| 6,275,648 B1 | 8/2001 | Knudson et al. |
| 6,289,169 B1 * | 9/2001 | Okuyama ..................... 386/231 |
| 6,324,338 B1 | 11/2001 | Wood et al. |
| 6,327,418 B1 | 12/2001 | Barton et al. |
| 6,441,862 B1 | 8/2002 | Yuen et al. |
| 6,481,013 B1 | 11/2002 | Dinwiddie et al. |
| 6,717,590 B1 | 4/2004 | Sullivan |
| 6,748,596 B2 | 6/2004 | Knudson et al. |
| 6,754,185 B1 | 6/2004 | Banerjee et al. |
| 6,756,997 B1 | 6/2004 | Ward et al. |
| 6,879,347 B1 | 4/2005 | French |
| 6,882,299 B1 | 4/2005 | Allport |
| 6,976,267 B1 | 12/2005 | Takano et al. |
| 6,990,676 B1 | 1/2006 | Proehl et al. |
| 2002/0059599 A1 | 5/2002 | Schein et al. |
| 2002/0095673 A1 | 7/2002 | Leung et al. |
| 2002/0154892 A1 | 10/2002 | Hoshen et al. |
| 2003/0044165 A1 | 3/2003 | Wood et al. |
| 2003/0142957 A1 | 7/2003 | Young et al. |
| 2008/0189742 A1 | 8/2008 | Ellis et al. |
| 2008/0189743 A1 | 8/2008 | Ellis et al. |

FOREIGN PATENT DOCUMENTS

| | | |
|---|---|---|
| EP | 0 836 320 A2 | 4/1998 |
| EP | 0 854 645 A2 | 7/1998 |
| EP | 0 969 661 | 1/2000 |
| EP | 0 993 185 | 4/2000 |
| GB | 2 227 622 A | 8/1990 |
| GB | 2 229 565 | 9/1990 |
| GB | 2 346 251 A | 8/2000 |
| WO | WO 93/23957 | 11/1993 |
| WO | WO 95/32587 | 11/1995 |
| WO | WO 96/26605 | 8/1996 |
| WO | WO 96/36172 | 11/1996 |
| WO | WO 96/37075 | 11/1996 |
| WO | WO 96/41478 | 12/1996 |
| WO | WO 97/13368 | 4/1997 |
| WO | WO 97/47136 | 12/1997 |
| WO | WO 97/48230 | 12/1997 |
| WO | WO 98/06219 | 2/1998 |
| WO | WO 98/47283 | 10/1998 |
| WO | WO 99/12346 | 3/1999 |

(56) References Cited

FOREIGN PATENT DOCUMENTS

| WO | WO 99/45700 | 9/1999 |
| WO | WO 99/52279 | 10/1999 |
| WO | WO 99/57895 | 11/1999 |
| WO | WO 99/66725 | 12/1999 |
| WO | WO 00/04706 | 1/2000 |
| WO | WO 00/07368 | 2/2000 |
| WO | WO 00/08849 | 2/2000 |
| WO | WO 00/08850 | 2/2000 |
| WO | WO 00/08851 | 2/2000 |
| WO | WO 00/08852 | 2/2000 |
| WO | WO 00/16548 | 3/2000 |
| WO | WO 00/28739 | 5/2000 |
| WO | WO 00/58833 | 10/2000 |
| WO | WO 00/58967 | 10/2000 |
| WO | WO 00/59214 | 10/2000 |
| WO | WO 00/59223 | 10/2000 |
| WO | WO 00/62298 | 10/2000 |
| WO | WO 00/62299 | 10/2000 |
| WO | WO 00/62533 | 10/2000 |
| WO | WO 00/67475 | 11/2000 |
| WO | WO 01/03088 | 1/2001 |
| WO | WO 01/22729 | 3/2001 |
| WO | WO 01/46843 A2 | 6/2001 |
| WO | WO 01/47238 A2 | 6/2001 |
| WO | WO 01/47249 A2 | 6/2001 |
| WO | WO 01/47257 A1 | 6/2001 |
| WO | WO 01/47273 A1 | 6/2001 |
| WO | WO 01/47279 A2 | 6/2001 |
| WO | WO 01/76239 A2 | 10/2001 |
| WO | WO 01/76248 A2 | 10/2001 |
| WO | WO 01/84834 | 11/2001 |
| WO | WO 01/93575 | 12/2001 |
| WO | WO 02/19691 | 3/2002 |

OTHER PUBLICATIONS

"DIRECTV Digital Satellite Receiver—Operating Instructions," Sony Electronics Inc. (2001).
"DIRECTV Receiver—Owners Manual," Samsung, DIRECTV, Inc. (2002).
"DIRECTV Receiver with TiVo Digital Satellite Receiver/Recorder SAT-T60—Installation Guide," Sony Electronics Inc. (2000).
"DIRECTV Receiver with TiVo Installation Guide," Philips, TiVo Inc. (2000).
"DIRECTV Receiver with TiVo Viewer's Guide," TiVo Inc., Sony Corp. (1999, 2000).
"DishPro Satellite System—Users Guide," Dish Network (Sep. 1, 2001).
"Fall 2001 TiVo Service Update with Dual Tuner!," TiVo Inc. (2001).
"PTV Recorder Setup Guide," Philips Electronics, TiVo Inc. (2000).
"RCA Satellite Receiver Users Guide," Thomson Multimedia Inc. (2001).
"Start Here," Sony, TiVo and DIRECTV (undated).

\* cited by examiner

PERSONAL VIDEO RECORDER SYSTEMS AND METHODS

CROSS REFERENCE TO RELATED APPLICATIONS

This application is a divisional of co-pending commonly assigned U.S. patent application Ser. No. 10/105,082, filed Mar. 21, 2002, which claims the benefit of U.S. provisional patent application No. 60/278,079, filed Mar. 22, 2001, U.S. provisional patent application No. 60/284,951, filed Apr. 19, 2001, and U.S. provisional patent application No. 60/290,714, filed May 14, 2001, all of which are hereby incorporated by reference herein in their entireties.

BACKGROUND OF THE INVENTION

The present invention relates to personal video recorder (PVR) systems and, more particularly, to PVR systems that include user television equipment having an interactive television program guide (IPG) with PVR extensions implemented thereon.

Products have recently been developed that allow users to manage their viewing experiences and record media with increased flexibility. PVRs, such as those provided by TiVo™ and ReplayTV™, record programs on hard-disk drives configured for multi-media storage. Users may schedule programs to be recorded and may play back the recorded programs at a later time. These products also record what users are watching in real-time, allowing users to pause real-time programs when, for example, the user must leave the room. The product may continue recording and storing the program being broadcast while the displayed program is paused. Users may resume their viewing where they left off, and may fast forward through commercials until they reach the point at which the program is currently being provided.

Interactive television applications, such as IPGs, are now widely available to the general public. IPGs may be used to provide interactive television services. Interactive television services include services for allowing a user to tune to a program, set parental locks, record a program, set reminders, etc.

IPGs may allow users to record programs on digital or analog storage devices (e.g., videocassettes, hard disks, floppy discs, flash memory, recordable compact discs (CDs), and recordable digital versatile discs (DVDs)). Programs may also be recorded on a program guide server, Internet server, or other server. The program guide server may be located at, for example, the cable system headend. The program guide may be an on-line program guide, which may be implemented using a web server on the Internet.

However, in most cases, the IPGs that facilitate television viewing remain separate from the applications that offer PVR functionality. For example, PVRs may include IPGs that are separate from the IPGs provided by other user equipment (e.g., a set-top box) and may require input devices and graphic interfaces separate from those used with existing IPGs. Subsequently, users often experience difficulty integrating existing IPGs with video recording applications.

It would therefore be desirable to provide an interactive television system having PVR functionality in which the user may use an IPG seamlessly with PVR functionality.

SUMMARY OF THE INVENTION

In view of the foregoing, it is an object of the present invention to provide an interactive television system having PVR functionality in which the user may use an IPG seamlessly with PVR functionality.

This and other objects of the present invention are accomplished by providing a PVR-compliant media recording system with an architecture that may include, for example, a PVR device, PVR application programming interfaces (APIs), PVR extensions, storage devices, and any additional hardware or software, or combination thereof, for the purpose of integrating PVR functionality to an IPG.

The high-level hardware architecture may involve a PVR-compliant device and PVR equipment having a PVR device. The PVR-compliant device may include an IPG that provides a user with the ability to record television programming. The user may control the IPG functionality by sending a command to the PVR-compliant device. A signal corresponding to the command may be generated by the PVR-compliant device and may be communicated to and executed by the PVR device.

The PVR-compliant device may include software and hardware configured to implement an IPG, PVR extensions, and PVR APIs. The PVR device may be coupled to the PVR-compliant device, and the PVR APIs may be configured to facilitate communications between the PVR device and the PVR-compliant device. The PVR device may include software and hardware configured to implement an IPG, PVR extensions, and PVR APIs.

The PVR-compliant device may include hardware interfaces and software interfaces that may provide an IPG with PVR features. The PVR extensions and PVR APIs may be configured to provide a seamless integration of PVR functionality with the IPG. For example, PVR-compliant applications may interface with existing IPGs implemented in other hardware, such as a set-top box, to perform the PVR functions.

When coupled to a PVR device, the PVR-compliant device may detect the PVR device being coupled, determine the type of PVR device being used based on information received from the PVR device, and establish communications with the PVR device based on the information received. This may be accomplished using intelligent PVR APIs implemented in the PVR-compliant device.

In a similar manner, the PVR device may detect the PVR-compliant device being coupled, determine the type of PVR-compliant device being used based on information received from the PVR-compliant device, and establish communications with the PVR-compliant device based on the information received. This may be accomplished using PVR APIs implemented in the PVR device.

A full-port of the IPG may be implemented in both the PVR equipment and the set-top box. A full-port of the IPG is a full implementation of the IPG application that includes of all features and functions associated with the IPG. In this dual-platform arrangement, where the IPG is implemented in both the PVR equipment and the set-top box, the integrated IPG may be used to provide PVR features and functionality when PVR equipment is being used. The dual-platform arrangement also allows either the PVR equipment or the set-top box to be used independently as a stand-alone system. Other configurations for integrating PVR features and functions may also be used.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
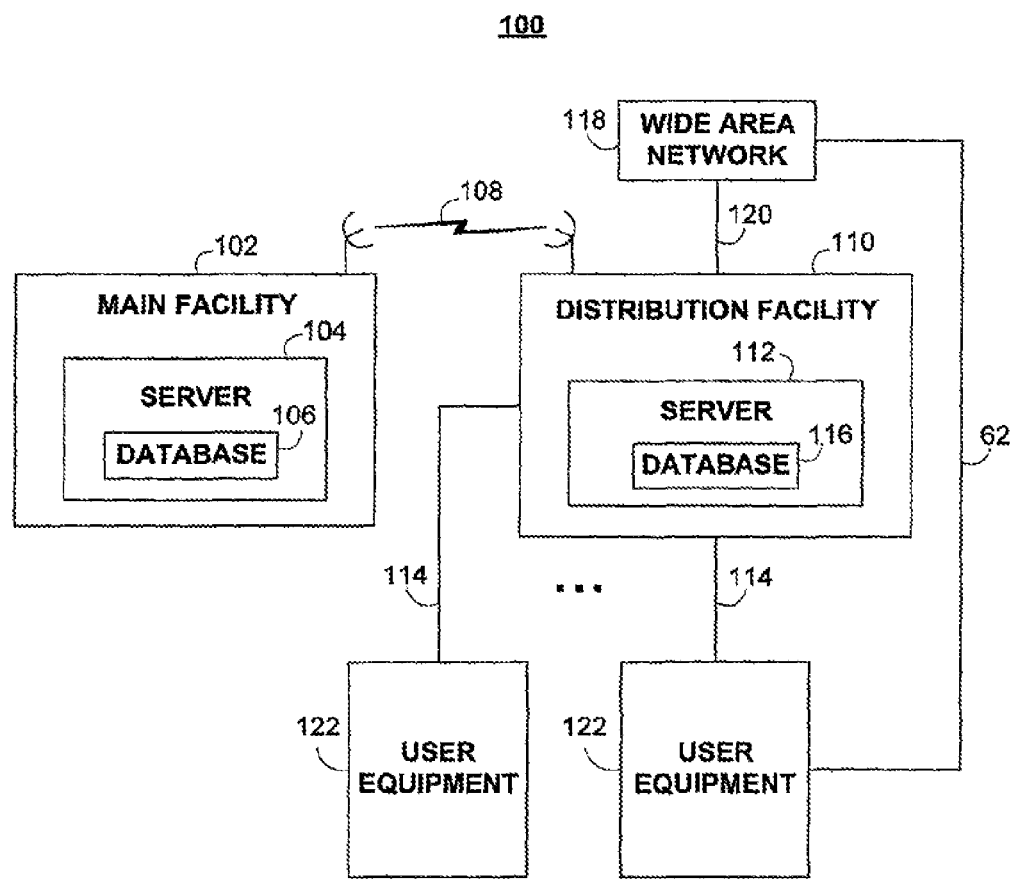
FIG. 1 is a diagram of an illustrative interactive television system in accordance with the present invention.

An illustrative interactive television system in accordance with the principles of the present invention is shown in FIG. 1. Illustrative interactive television system 100 may include main facility 102, distribution facility 110, and user equipment 122. Illustrative interactive television system 100 may include multiple main facilities 102. Only one main facility 102, however, is illustrated in FIG. 1 to avoid over-complicating the drawing.

Main facility 102 may include server 104 for storing and distributing IPG information from program guide database 106. Program guide database 106 may store program guide information such as television program listings information, service listings information, program-related information, VOD program information, pay-per-view ordering information, promotional information, or any other suitable program guide information. Main facility 102 may distribute the program guide information to distribution facility 110 via communications path 108.

Communications path 108 may be any suitable communications path; such as a satellite link, a cable link, a fiber-optic link, a microwave link, a telephone network link, an Internet link, or a combination thereof. If it is desired to transmit video signals (e.g., television programs) over communications path 108 in addition to data signals, a relatively high bandwidth link such as a satellite link may be preferable to a relatively low bandwidth link such as a telephone line. Only one distribution facility 110 is shown in FIG. 1 to avoid over-complicating the drawing. Multiple distribution facilities may be involved in implementing interactive services.

The program guide information or content transmitted by main facility 102 to distribution facility 110 may include television program listings data (such as program times, channels, titles, descriptions, program type, genre, actors) or any other suitable data.

The promotional information transmitted by main facility 102 to distribution facility 110 may include various promotional banners, promotional ads, promotional slogans, promotional advertisements, or any other suitable promotional material.

Distribution facility 110 may be a television distribution facility for broadcast television, a cable system headend, a satellite distribution facility, or any other suitable distribution facility for distributing signals to viewers. Distribution facility 110 may distribute program guide information, programming content, or any other suitable content or information to user equipment 122 via communications paths 114. Distribution facility 110 may include server 112 for storing such content and information. Server 112 may be used for distributing television programming, music, or any other suitable type of media in response, for example, to requests for such content and information. Server 112 may include a local database 116 for storing various information and content (e.g., program guide information) or for storing recorded programs remotely. Storing recorded programs remotely on a server at the distribution facility may be an alternative to a storage media in the user's home. Client-server based interactive television systems with remote server recording are illustratively described, for example, in Ellis, et al. U.S. patent application Ser. No. 09/332,244, filed Jun. 11, 1999, which is hereby incorporated by reference herein in its entirety. Additional techniques for storing programs and program information are illustratively described, for example, in Hassell, et al. U.S. patent application Ser. No. 09/157,256, filed Sep. 17, 1998 which is hereby incorporated by reference herein in its entirety. In addition, server 112 may be capable of providing other interactive services such as near video-on-demand and video-on-demand. Server 112 may include one or more computers.

If desired, some or all of the information distributed to distribution facility 110 may be provided using information sources other than main facility 102. For example, distribution facility 110 may receive information from wide area network 118 (e.g., the Internet) via communications path 120. Communications path 120 may be a T1 link, a digital subscriber line (DSL) link, a cable modem link, an analog modem link, or any other suitable link.

If desired, data may be provided to user equipment 122 using facilities other than main facility 102 and distribution facility 110. For example, user equipment 122 may receive data directly from wide area network 118 via communications path 62. Communications path 62 may be a T1 link, a DSL link, a cable modem link, an analog modem link, radio frequencies such as a paging system, or any other suitable link. In another example, a separate facility such as a satellite broadcasting system (not shown) may transmit data to user equipment 122, which may receive data via a satellite receiving system (not shown).

Communications path 114 may be any suitable type of link that allows distribution facility 110 to distribute program guide information, television programming, or any other suitable information, data, or media to user equipment 122. There may be more than one communications path 114 that couples each user equipment 122 to distribution facility 110. For example, if distribution facility 110 is a cable headend, user equipment 122 may receive information via a cable link and may transmit information to distribution facility 110 via a digital serial link, a dial-up modem connection, or any other suitable link. Each of communication paths 114 may be uni-directional or bi-directional.

User equipment 122 may be configured to send or receive e-mails via communication path 122 or communications path 120. User equipment 114 may receive e-mails that were sent by distribution facility 110 or by some other facility.

An interactive television application, in accordance with the embodiments described herein, may be implemented in user equipment 122 to provide interactive services to a user. Interactive services may enable a user to interact with television applications, for example, by setting particular channels as favorites, by changing channels, by ordering pay-per-view (PPV) movies, by selecting programs to be recorded, by playing recorded programs, etc. An interactive television application may be an IPG application, or an interactive personal video recorder application that may be used to provide interactive services to users.

User equipment 122 may be based on a television platform, a computer platform, or both. For example, user equipment 122 may include user television equipment (e.g., a television set, a PVR, and a set-top box), user computer equipment (e.g., a desktop computer, a laptop computer, a handheld computing device such as a personal digital assistant or any other small personal computing device, etc.), or any other suitable user equipment for implementing an IPG. User computer equipment may include a computer based receiver having integrated set-top box circuitry or a personal computer television (PC/TV). If desired, user television equipment may include computer equipment for receiving e-mails.

Figure 2:
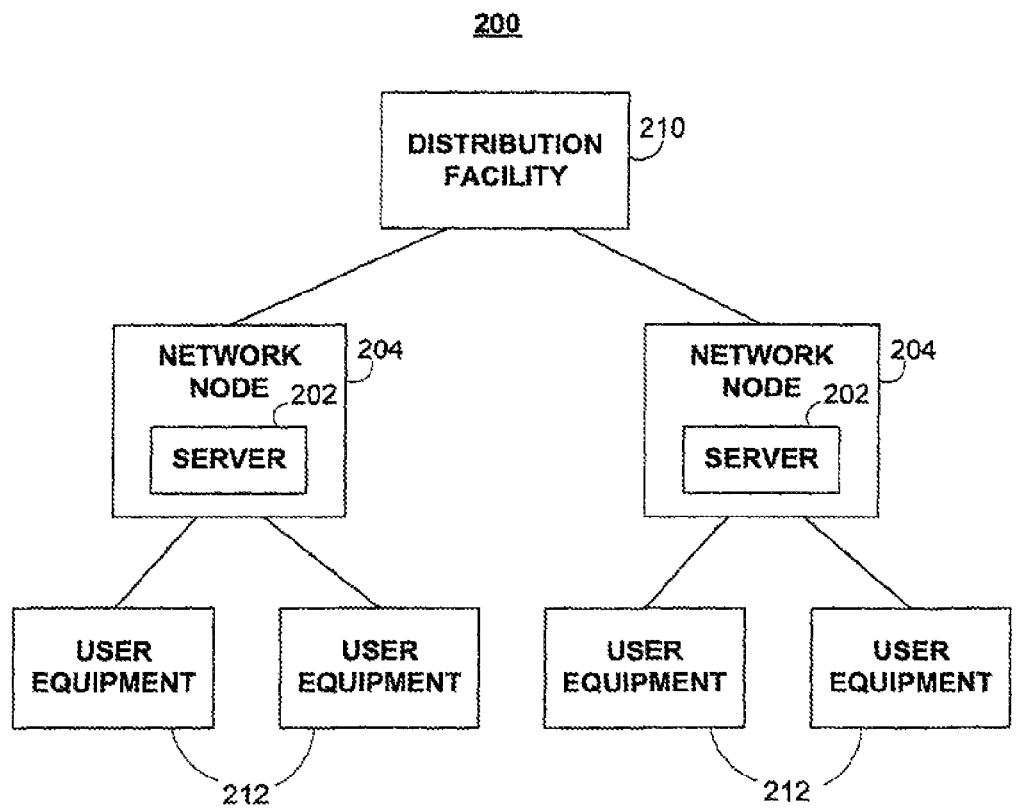
FIG. 2 is a diagram of an illustrative interactive television system having network nodes in accordance with the present invention.

As shown in FIG. 2, the capabilities of server 112 (FIG. 1) may be provided using servers 202, located at network nodes 204. Servers such as servers 202 may be used instead of server 112 or may be used in conjunction with server 112 located at distribution facility 110. Servers 202 may include web servers, main frame computers, or any suitable device or devices. User equipment 212 may include any suitable device for providing an IPG such as user television equipment.

Figure 3:
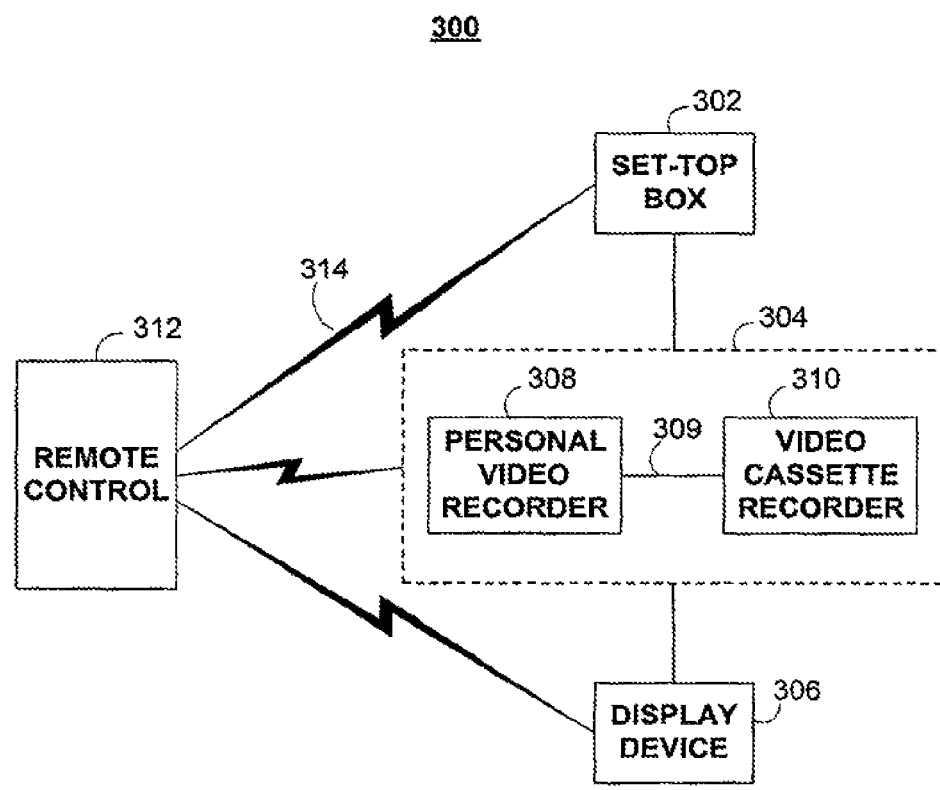
FIG. 3 is a diagram of illustrative user television equipment in accordance with the present invention.

FIG. 3 shows illustrative user television equipment 300 that is based on a set-top box arrangement. User television equipment 300 may include set-top box 302, recording device 304, display device 306, and remote control 312. FIG. 3 illustrates that set-top box 302 is coupled to recording device 304 and that recording device 304 is coupled to display device 306. These couplings may be based on wired connections, wireless connections, or any suitable network connection. FIG. 3 also shows that remote control 312 may be able to communicate with set-top box 302, recording device 304, and display device 306 via a wireless link 314. Persons skilled in the art will appreciate that set-top box 302, recording device 304, remote control 312, and display device 306 may be interconnected differently than that shown in FIG. 3 and that components may be added or removed. For example, recording device 304 may be integrated with set-top box 302 in a single device.

Set-top box 302 may receive signals transmitted by distribution facility 110 (FIG. 1) (e.g., audio, video, or IPG data). Set-top box 302 may include a storage device (e.g., a hard drive) or memory for storing personal user preferences settings, user-programmed reminders, or other information. For illustrative purposes, the present invention will be described in the context of user television equipment 300, which has set-top box 302 as its receiver or tuner. If desired, user television equipment 300 may include multiple tuners which may be used for simultaneously watching one program and recording another. IPGs with simultaneous watch and record capabilities are illustratively described, for example in Lemmons et al. U.S. patent application Ser. No. 09/329,850, filed Jun. 11, 1999, which is hereby incorporated by reference herein in its entirety.

Set-top box 302 may be coupled to recording device 304. Recording device 304 may include PVR 308, VCR 310, or any other suitable recording device. Recording device 304 may include one or both of PVR 308 and VCR 310. If the user desires to record a program, set-top box 302 may be manually or automatically tuned to a particular channel and control signals may be sent to recording device 304 to record that program. Data link 309 may couple PVR 308 and VCR 310, and may be a cable link or any other suitable data link. Data link 309 may be used to transfer audio/video signals for programs between PVR 308 and VCR 310.

Set-top box 302 may send audio/video signals and signals that are representative of graphics to display device 306 for presentation to the user. If desired, set-top box 302 may route signals to display device 306 through recording device 304. Display device 306 may be a television, a computer monitor, a computer system with a monitor and speakers, a flat panel display, or any other suitable display device.

Set-top box 302 may be arranged in a client/server relationship with PVR 308. In one embodiment of the present invention, set-top box 302 may function as a server and PVR 308 may function as a client. All requests for information received from remote control 312 or other input devices may be routed first through the set-top box 302. If, for example, a user requests PVR information or a PVR recording, the request may first be processed by set-top box 302 which may communicate with PVR 308 to obtain the information or recording. Set-top box 302 may send audio/video signals and signals that are representative of graphics to display device 306 based on the communications with PVR 308. Other arrangements for establishing communications and operations between PVR 308, set-top box 302, and display device 306 may also be used.

A user may interact with any of the components in user television equipment 300 and with an IPG using one or more input devices, such as remote control 312. Remote control 312 may have various buttons that may be pressed by the user to interact with portions of an IPG. For illustrative purposes, many aspects of the present invention are discussed primarily in the context of an input device that is a remote control. Other suitable input devices such as a conventional keyboard, a wireless keyboard, a touch screen display remote, a handheld computer, a mouse, a trackball, or a touch pad may also be used.

An IPG may be implemented locally on user equipment 300 or may be implemented using a client-server or distributed architecture where some of the program guide application is implemented locally on user equipment 300. Client-server program guides are illustratively described, for example, in Ellis et al. U.S. patent application Ser. No. 09/374,043, filed Aug. 13, 1999, which is hereby incorporated by reference herein in its entirety. If desired, an IPG for providing the features and functionalities discussed herein may be partly implemented in PVR 308, set-top box 302, or both.

Figure 4:
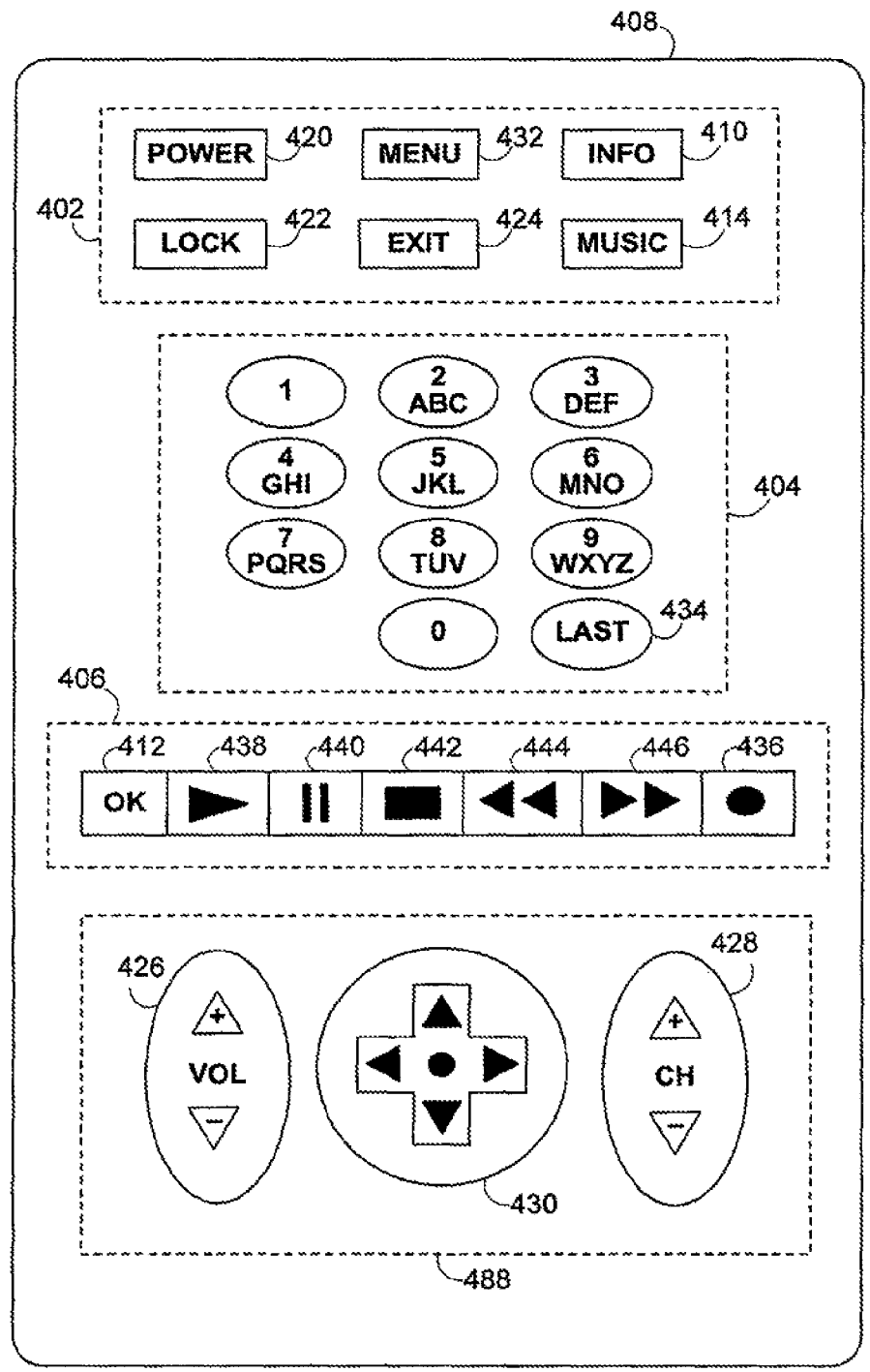
FIG. 4 is a diagram of an illustrative remote control in accordance with the present invention.

FIG. 4 shows illustrative remote control 408 that may include various function buttons. Remote control 408 may include primary option buttons 402 that may provide a user with access to frequently used actions in an interactive television system having IPG functionality. Primary option buttons 402 may include power button 420, menu button 432, info button 410, lock button 422, exit button 424, and music button 414. Menu button 432 may provide the user with the ability to cause a menu display screen to be displayed. Info button 410 may provide the user with the ability to display an information display screen. Lock button 422 may provide the user with the ability to modify access privileges to certain programs, channels, or other television content. Exit button 424 may provide the user with the ability to exit a program guide. Music button 414 may provide the user with the ability to listen to music channels that carry audio.

Remote control 408 may include alphanumeric buttons 404 that may be used for entry of alphanumeric characters. Alphanumeric buttons 404 may further include last button 434 which may provide the user with the ability to return to the last channel that was watched or the last screen that was displayed.

Remote control 408 may include task buttons 406 that may provide means for directing a task to be performed by user equipment (e.g., user equipment 300 of FIG. 3). Task buttons 406 may include, for example, play button 438, pause button 440, stop button 442, rewind button 444, fast-forward button 446, record button 436, "OK" button 412, or any other suitable task button. Remote control 408 may include control buttons 488 that may include volume control buttons 426, navigation buttons 430, and channel control buttons 428. Navigation buttons 430 may provide the user with the ability to adjust or move a desired element (e.g., a cursor, a highlight window, etc.) vertically or horizontally. For example, if the desired element is a cursor in an IPG display screen, navigation buttons 430 may be used to move the cursor in the display screen. "OK" button 412 in task buttons 406, in combination with navigation buttons 430, may provide the user with the ability to make on-screen selections. Remote control buttons are also sometimes referred to herein as remote control keys.

Figure 5:
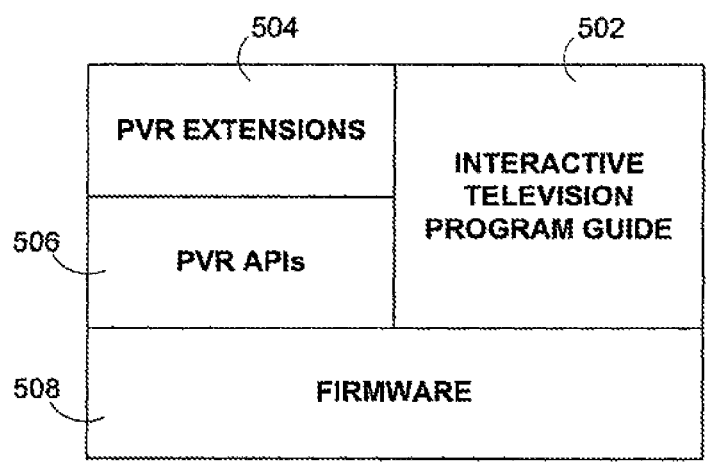
FIG. 5 is a diagram of an illustrative PVR-compliant device that may be used in accordance with the present invention.

In one embodiment of the present invention, interactive television system 100 (FIG. 1) may include a PVR-compliant media recording system for recording television programming having PVR-compliant device 500 of FIG. 5. PVR-compliant device 500 may include, for example, IPG 502, PVR extensions 504, PVR APIs 506, firmware 508, any other component needed to accommodate PVR functionality, or any combination thereof. Components of PVR-compliant device 500 may be located in, for example, a PVR sidecar, a PVR server, a set-top-box, any suitable location or locations, or a combination thereof.

IPG 502 may be any IPG capable of displaying program information made available through distribution facility 110. PVR extensions 504 may include any suitable hardware, software, or both that may be used in conjunction with IPG 502 or any other suitable interactive television application. In one suitable approach, PVR extensions 504 may be implemented together with IPG 502 (e.g., as part of a single software component). In another suitable approach, PVR extensions 504 may be implemented separately from IPG 502 (e.g., as a separate software module), but may work in conjunction with IPG 502 as a separate functional component.

Whether separate from IPG 502 or integrated as part of IPG 502, PVR extensions 504 may enable a seamless integration of IPG 502 with PVR functionality. This seamless integration may include, for example, using the same interface motif for PVR-related functions as is used for IPG-related functions. By providing such add-on PVR-enabling features to IPG 502, PVR equipment may be combined with IPG 502 to provide a single interface with which to operate both IPG 502 and the PVR equipment.

In one suitable approach, PVR equipment having a PVR device may be coupled to PVR-compliant device 500 to provide PVR functionality. PVR equipment may include any combination of software, hardware, or both that provides PVR functionality using a PVR. PVR equipment may include, for example, a PVR sidecar, a PVR server, an integrated set-top box, or any other suitable hardware, software, or both that enables PVR functionality.

PVR APIs 506 may be used to facilitate communication between the IPG and the PVR equipment. PVR APIs 506 may provide a set of routines, protocols, tools, or a combination thereof, for communicating with the PVR device.

In one suitable approach, in the absence of an API standard for use with the PVR device, PVR APIs 506 may be vendor-specific. More particularly, in this approach, only certain PVR devices may be used in conjunction with PVR-compliant device 500. For example, PVR devices may be made to be compatible with a particular PVR-compliant device 500 having vendor-specific PVR APIs 506. Alternatively, PVR-compliant device 500 having vendor-specific PVR APIs 506 may be made to be compatible with a particular PVR device. A PVR vendor may be responsible for implementing PVR APIs 506 for a specific PVR device.

In another suitable approach, PVR APIs 506 may be vendor-independent (e.g., based on industry standard or proprietary standard PVR APIs). Designing PVR APIs 506 in this way may allow IPG 502 to be developed independently from the PVR device, providing flexibility in the selection of the PVR device. Also, PVR devices may be developed independently from PVR APIs 506.

PVR APIs 506 may include functionality for determining the type (model, manufacturer, etc.) of PVR device being used. For example, PVR APIs 506 may include a library of multiple vendor-specific APIs, generic APIs, or both. In this approach, PVR APIs 506 may be used to determine which of the vendor-specific APIs should be used based on a determination of the type of PVR device coupled to PVR-compliant device 500 or by any other suitable criteria (e.g., using firmware 508, PVR extensions 504, or IPG 502).

In one suitable arrangement, PVR APIs 506 having a library of intelligent APIs may be implemented in PVR-compliant device 500. In this arrangement, PVR APIs 506 may automatically detect the PVR device when coupled to PVR-compliant device 500, test and diagnose the PVR device, and automatically generate the driver source code for the specific PVR device being used.

Figure 6:
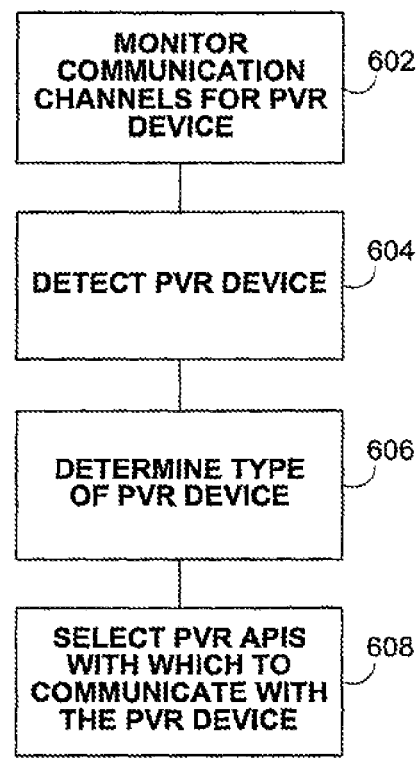
FIGS. 6-7 are flow-charts of illustrative steps involved in establishing communications between PVR equipment and a PVR-compliant device in accordance with the present invention.

FIG. 6 is a flow chart of illustrative steps involved in determining the type of PVR device being used. At step 602, PVR-compliant device 500 (FIG. 5) may monitor one or more communication channels (e.g., hardware interfaces). This monitoring may be done in any suitable way. For example, any suitable "hot pluggable" technique (e.g., as used for a universal serial bus) may be used, whereby a peripheral hardware device may be detected when coupled accordingly. If a "hot pluggable" method is not supported, the PVR-compliant device may monitor one or more communication channels at power-up. The monitoring may be either a continuous, substantially continuous, or periodic process. At step 604, if and when the PVR device is coupled to PVR-compliant device 500, the PVR device may be detected. Upon detection of the PVR device, PVR-compliant device 500 may determine the type of device that has been coupled at step 606. The determination of the type of PVR device may be made, for example, using any suitable handshaking protocol. In one suitable approach, one or more of the PVR APIs 506 may be used to "handshake" with the PVR device. Based on the result of this query, a set of APIs of PVR APIs 506 that correspond to the type of detected PVR device may be selected for use in communicating with the PVR device at step 608.

In another suitable arrangement, PVR APIs 506 having a library of intelligent APIs may be implemented in the PVR device. In this arrangement, PVR APIs 506 may automatically detect PVR-compliant device 500 when coupled to the PVR device, test and diagnose PVR-compliant device 500, and communicate with the specific PVR-compliant device 500 using the appropriate corresponding APIs.

Figure 7:
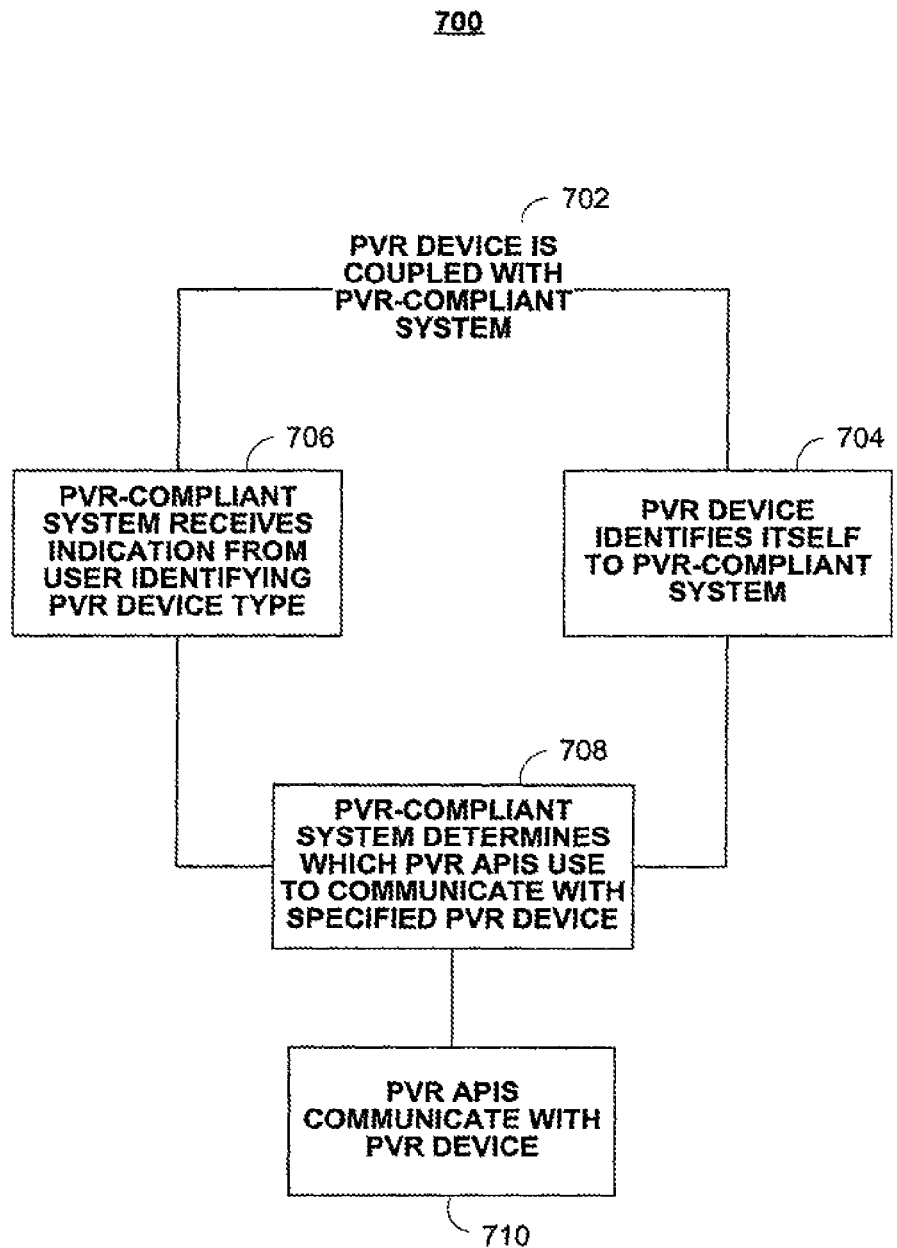

FIG. 7 is a flow chart of illustrative steps involved in determining the type of PVR-compliant device being used. The PVR device, or any other suitable device, may be coupled with PVR-compliant device 500 in step 702. The PVR device may then identify itself to PVR-compliant device 500 in step 704 using a "handshake" technique as discussed above. In another suitable approach, PVR-compliant device may receive indication from the user as to the type of PVR device being used in step 706. As a result of either of steps 704 or 706, the PVR device may then determine the appropriate PVR APIs to be used when communicating with the PVR-compliant device in step 708. The selected PVR APIs may then communicate with the PVR-compliant device in step 710.

The foregoing description of monitoring techniques that may be used by PVR-compliant device 500 and the PVR device are to illustrate embodiments where the PVR device is implemented in PVR equipment separate from the PVR-compliant device. Such monitoring and detection would not be necessary if the PVR device were integrated into PVR-compliant device 500. However, in another suitable arrangement, PVR-compliant device 500 may have peripheral component interconnect (PCI) interfaces, industry standard architecture (ISA) interfaces, integrated drive electronic (IDE) interfaces, small computer system interfaces (SCSI), or any other suitable interfaces that may be used to create an integrated device by way of the above-mentioned monitoring and detection.

After determining the appropriate PVR APIs to use in facilitating communication between the PVR device and PVR-compliant device 500, PVR APIs 506 may be used to execute any suitable functions, routines, or any other suitable programming constructs, to provide any suitable protocols, to provide any suitable tools, or to provide any combination thereof. For example, the following Tables 1-10 show illustrative programming constructs that may be provided by PVR APIs 506, such as general disk management, file support, video playback controls, video processing support, etc.

TABLE 1

General Disk Management

| | | |
|---|---|---|
| Format Hard Drive | Inputs | |
| | Outputs | Indication of success or failure of format and free space available. |
| Directory of Files | Inputs | |
| | Outputs | List of file names owned by this application |
| File Type Request | Inputs | File name |
| | Outputs | Program file, data file, etc. |
| Free Space Inquiry | Inputs | |
| | Outputs | Amount of free disk space available to this application |

TABLE 2

Program File Record Support

| | | |
|---|---|---|
| Supported Record Quality Levels Inquiry | Inputs | N/A |
| | Outputs | List of supported quality levels |
| Quality Level Info | Inputs | Specific quality level |
| | Outputs | Disk space required per second for specified quality level |
| Record Current Program | Inputs | Size and type of buffer allocated to beginning and end of recording, level of recording quality, channel selection, series or one-time recording, etc. |
| | Outputs | File name and indication of success or failure to record program |
| Stop Recording | Inputs | File name |
| | Outputs | Indication of success or failure to stop recording |
| Pause Recording | Inputs | File name |
| | Outputs | Indication of success or failure to pause recording |
| Resume Recording | Inputs | File name |
| | Outputs | Indication of success or failure to resume recording |
| Change Record Attributes | Inputs | File name, new buffer size/type, new level of recording quality, new channel selection, change type of recording (i.e. series or one-time recording), etc. |
| | Outputs | Indication of success or failure to change record attributes |
| Asynchronous Program File Information Returned to Guide While Recording | | If the system is out of disk space the recording stops If the buffer is full the recording stops |

TABLE 3

Program File Playback Support

| | | |
|---|---|---|
| Open File for Playback | Inputs | File name, file offset |
| | Outputs | Indication of success or failure to open file for playback |

TABLE 3-continued

Program File Playback Support

| | | |
|---|---|---|
| Close File for Playback | Inputs | File name |
| | Outputs | Indication of success or failure to close file for playback |
| Asynchronous Program File Information Returned to Guide While Playing | | The end or beginning of a program has been reached<br>Index data at current location in recording<br>Bookmark recording at current location<br>Change the level of recording quality |

TABLE 4

Program File Linked Data Item Support

| | | |
|---|---|---|
| Write Data Item to Program File | Inputs | File name, file header information, file offset |
| | Outputs | Indication of success or failure to write data item to program file |
| Retrieve Linked Data Items | Inputs | File name |
| | Outputs | List of data items for each item, (e.g., item number, header information, file offset, data size, etc.) |
| Read Data Item | Inputs | File name, file offset, or data item number |
| | Outputs | Indication of success or failure to read data item |
| Delete Data Item | Inputs | File name, file offset, or data item number |
| | Outputs | indication of success or failure to delete data item |

TABLE 5

Program File Bookmark Support

| | | |
|---|---|---|
| Bookmark Current Location (valid during record or playback) | Inputs | File name, bookmark ID |
| | Outputs | Indication of success of failure to bookmark current location |
| Jump to Playback Location | Inputs | File name, bookmark ID, offset |
| | Outputs | Indication of success of failure to jump to playback location |
| Retrieve List of Bookmarks | Inputs | File name |
| | Outputs | List of bookmarks (for each bookmark, bookmark ID, offset) |
| Delete Bookmark | Inputs | File name, bookmark ID |
| | Outputs | Indication of success or failure to delete bookmark |

TABLE 6

General Program File Support

| | | |
|---|---|---|
| Get Information About Program File | Inputs | File name |
| | Outputs | List program file status, size, record quality, offset, buffer, number of bookmarks, number of linked data items, etc. |
| Delete Program File | Inputs | File name |
| | Outputs | Indication of success or failure to delete program file |

TABLE 7

Video Playback Control

| | | |
|---|---|---|
| Trick Mode Inquiry | Inputs | N/A |
| | Outputs | List of supported "trick" modes (Number of rewind speeds, number of fast forward speeds, number of slow play speeds, number of reverse play speeds, support for single frame advance, support for single frame reverse) |

TABLE 7-continued

Video Playback Control

| | | |
|---|---|---|
| Pause | Inputs | File name |
| | Outputs | Indication of success or failure to pause recording playback |
| Rewind | Inputs | File name, speed |
| | Outputs | Indication of success or failure to rewind recording playback |
| Fast Forward | Inputs | File name, speed |
| | Outputs | Indication of success or failure to fast forward recording playback |
| Play | Inputs | File name, speed |
| | Outputs | Indication of success or failure to play recording playback |
| Play Reverse | Inputs | File name, speed |
| | Outputs | Indication of success or failure to play recording playback in reverse |
| Single Frame Advance | Inputs | File name |
| | Outputs | Indication of success or failure to single frame advance recording playback |
| Single Frame Reverse | Inputs | File name |
| | Outputs | Indication of success or failure to single frame reverse recording playback |
| Stop Playback | Inputs | File name |
| | Outputs | Indication of success or failure to stop playback |

TABLE 8

Other Video Processing Support

| | | |
|---|---|---|
| Overlay onto Output Video | Inputs | Graphics to be overlaid |
| | Outputs | Indication of success or failure to overlay graphics onto output video |
| Playback Volume Control | Inputs | Volume level, mute on/off |
| | Outputs | Indication of success or failure to control playback volume |
| Video Effects | Inputs | Specific effect (e.g. resize video, reposition video, etc.) |
| | Outputs | Indication of success or failure to control video effects |

TABLE 9

Program Editing Support

| | | |
|---|---|---|
| Create New Blank Program File | Inputs | N/A |
| | Outputs | Indication of success or failure to create a new blank program file and file name (if successful) |
| Copy Program File | Inputs | File name, offset, bookmark, overwrite or append |
| | Outputs | Indication of success or failure to copy program file |
| Trim Program File (delete program between two locations) | Inputs | Input File Name, Starting Offset or Bookmark, Ending Offset or Bookmark |
| | Outputs | Indication of success or failure to trim program file |

TABLE 10

Data File Support

| | | |
|---|---|---|
| Create New Data File | Inputs | File identifier, size and type of file |
| | Outputs | Indication of success or failure to create new data file |
| Open Data File for Appending | Inputs | File Identifier |
| | Outputs | Indication of success or failure to open data file for appending, file name |
| Write Data to File | Inputs | File name, data and size |
| | Outputs | Indication of success or failure to write data to file |
| Close Data File | Inputs | File name |
| | Outputs | Indication of success or failure to close data file |
| Open Data File for Reading | Inputs | File identifier |
| | Outputs | Indication of success or failure to open data file for reading, file name |
| Read Data from File | Inputs | File name, size |
| | Outputs | Indication of success or failure to read data from file, data, and size |
| Delete Data File | Inputs | File identifier |
| | Outputs | Indication of success or failure to delete data file |
| Get Information About Data File | Inputs | File identifier |
| | Outputs | List data file status, size and type |
| Open Data File for Playback | Inputs | File identifier, offset |
| | Outputs | Indication of success or failure to open data file for playback, File Name |

It will be understood that the PVR API programming constructs of Tables 1-10 are merely illustrative. Any other suitable API programming construct may be used instead of or in addition to those illustrated. It will further be understood that any suitable modification may be made to the APIs of Tables 1-10 in accordance with, for example, a particular arrangement of hardware, software, or both being used.

Figure 8:
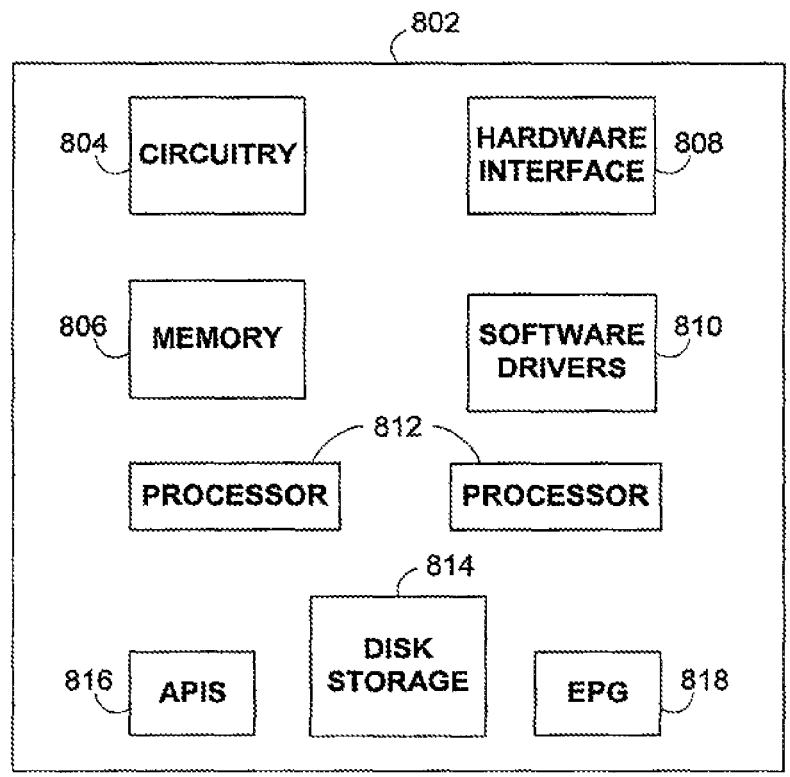
FIG. 8 is a diagram of an illustrative arrangement of software and hardware on a PVR device in accordance with the present invention.

One suitable function of the PVR APIs is to facilitate communication between IPG 502 of PVR-compliant device 500 and the PVR device implemented in PVR equipment. FIG. 8 shows one configuration of PVR software and hardware that may be used to implement PVR device 802 on PVR equipment or any other suitable equipment. In one suitable arrangement, PVR equipment may contain only PVR device 802. In other suitable arrangements, PVR equipment may include PVR device 802, other components of PVR-compliant device 500 (e.g., PVR APIs 506), any additional hardware or software, or a combination thereof.

PVR device 802 may include any suitable hardware, software, or both including, for example, circuitry 804, memory 806 (e.g., random access memory (RAM) or any other suitable solid state volatile or non-volatile memory devices), hardware interfaces 808 (e.g., serial interface (i.e. RS-232), parallel interface (i.e. high-performance parallel interface (HIPPI)), universal serial bus (USB) interface, FireWire (i.e. Institute of Electrical and Electronics Engineering (IEEE) 1394) interface, wireless interface (i.e. wireless application environment (WAE)), RGB component interface, RJ-45 interface, telephone line interface, Ethernet interface, coaxial cable interface, optical interface, or any other suitable interface), software drivers 810, processors 812, storage devices 814 (e.g., hard-drives or any other suitable magnetic storage devices, optical storage devices, or any other suitable storage devices), APIs 816, IPG or IPG-like applications 818, or any other suitable hardware or software. PVR device 802 may provide, among other things, functionality related to the recording, storage, scheduling, retrieval, and playback of television programming.

It will be understood that PVR-compliant device 500 and PVR device 802 may be used in any suitable arrangement with any suitable additional software, hardware, or both. For example, components of PVR-compliant device 500 and PVR device 802 may be interchanged or otherwise moved from one to the other in any suitable way.

Figure 9:
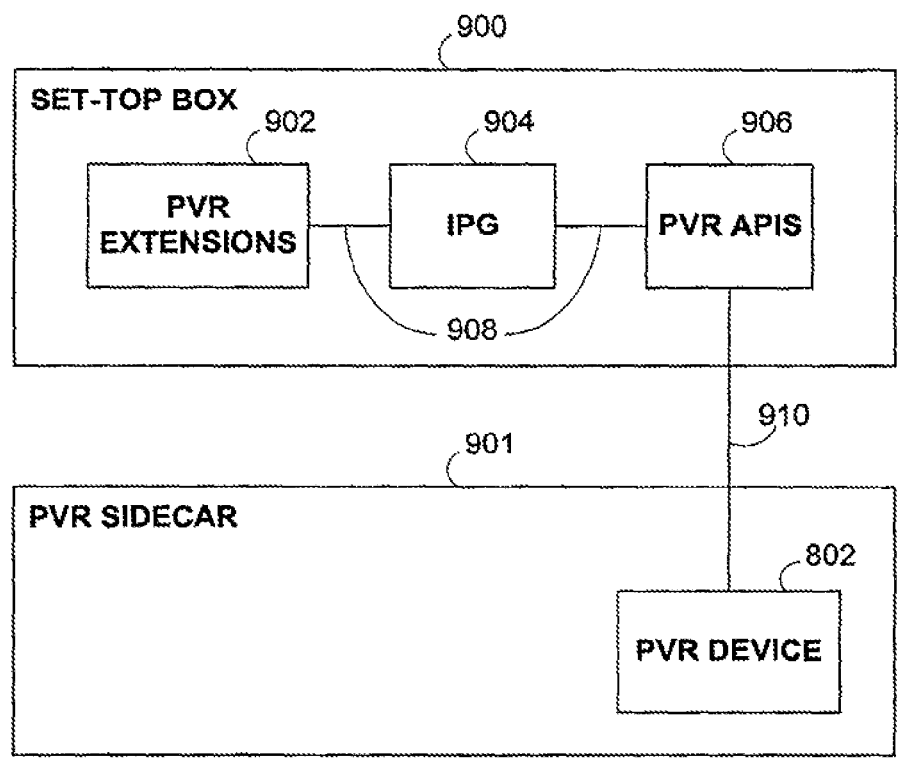
FIGS. 9-14 are diagrams of illustrative arrangements for implementing a PVR device using a PVR sidecar in accordance with the present invention.

In one suitable embodiment of the present invention, PVR-compliant device 500 may be used in conjunction with a PVR sidecar to provide PVR functionality as illustrated in FIGS. 9-14. In the arrangement illustrated in FIG. 9, PVR-compliant device 500 may be implemented in set-top box 900, which may be part of user television equipment 300 (FIG. 3). PVR device 802 may be implemented in PVR sidecar 901. PVR sidecar 901 may include any suitable hardware, software, or both in addition to PVR device 802 to provide any suitable functionality. In one suitable arrangement, PVR sidecar 901 may include only PVR device 802 (as shown in FIG. 9).

PVR sidecar 901 may communicate with set-top box 900 via communications path 910, which may be any suitable wired or wireless communications path. For example, if Wire-based, communications path 910 may be a serial cable, parallel cable, telephone cable, fiber optic cable, coaxial cable, Ethernet cable, USB cable, FireWire cable, component video cables, composite cables, any other suitable wire-based communications path, or any combination thereof. If wireless, any suitable communications protocol or standard such as IEEE 802.11, wireless application protocol (WAP), radio frequency (RF), Bluetooth, (Extended) time division multiple access (TDMA), code-division multiple access (CDMA), global systems for mobile communications (GSM), or any other suitable wireless communications path or protocol may be used.

PVR extensions 902 may be combined with IPG 904 to create a single software component. If PVR extensions 902 are not implemented as part of IPG 904 (as shown herein), PVR extensions 902 may be independent software modules separate from IPG 904 and may communicate and function in conjunction with IPG 904. Programming modules that include PVR extensions 902 may be implemented locally using an installation device (e.g., a personal computer, personal digital assistant, USB installation device, etc.) or may be downloaded to set-top box 900 or PVR sidecar 901 from a remote location (e.g., a cable headend, a distribution facility (such as distribution facility 110), software support, a web server, or from any other suitable location) using a cable modem, an integrated services digital network (ISDN) modem, a DSL modem, a telephone modem, a virtual private network (VPN), wireless connection, or any other suitable communications path or protocol.

PVR device 802 in PVR sidecar 901 may communicate with IPG 904 having PVR extensions 902 via PVR APIs 906. In FIG. 9, IPG 904 having PVR extensions 902 and PVR APIs 906 are implemented in set-top box 900. PVR APIs 906 may be implemented locally in set-top box 900 using an installation device (e.g., a personal computer, personal digital assistant, etc.) or may be downloaded to set-top box 900 or PVR sidecar 901 from a remote location (e.g., a cable headend, a distribution facility (such as distribution facility 110), a software support center, a web server, or any other suitable location) using a cable modem, an ISDN modem, a DSL modem, a telephone modem, a VPN, wireless connection, or any other suitable communications path or protocol.

Communication between components implemented in the set-top box may occur via communications path 908, which may include serial connections, parallel connections, wireless connections, any suitable connection for communicating information, or any combination thereof.

Figure 10:
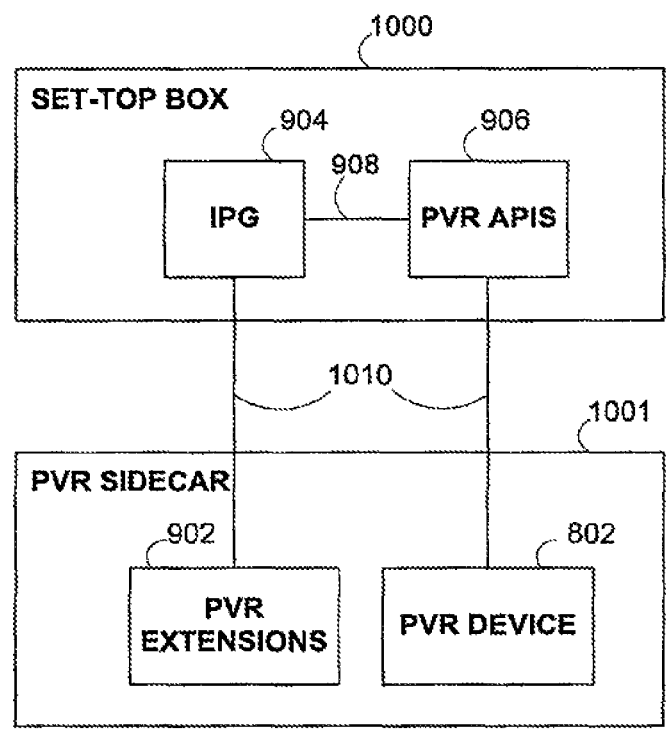

In another suitable arrangement, as illustrated in FIG. 10, IPG 904 and PVR APIs 906 may be implemented in set-top box 1000 while PVR extensions 902 and PVR device 802 are implemented in PVR sidecar 1001. IPG 904 may communicate with PVR APIs 906 via communications path 908 in set-top box 1000. PVR APIs 906 may in turn communicate with PVR device 802 via communications path 1010, which may be any suitable wired or wireless communications path. IPG 904 may communicate with PVR extensions 902 on PVR sidecar 1001 via communications path 1010. This arrangement is advantageous because it allows for a "plug and play" PVR sidecar that provides set-top box 1000 with the necessary PVR functionality (via PVR device 802) and application enhancements (via PVR extensions 902) together in a single sidecar unit.

Figure 11:
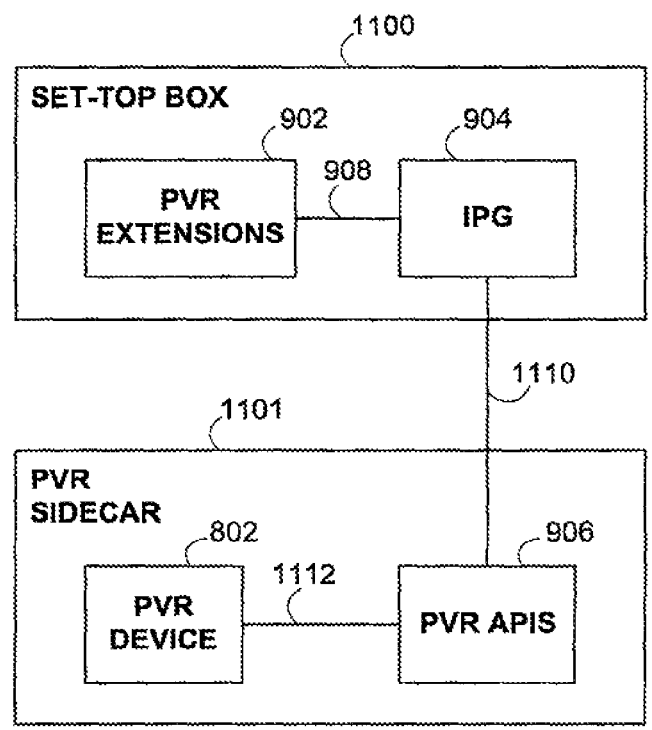

In FIG. 11, IPG 904 and PVR extensions 902 are implemented in set-top box 1100 while PVR device 802 and PVR APIs 906 are implemented in PVR sidecar 1101. This arrangement is advantageous because all components relating directly to the IPG are located on set-top box 1100 while all components relating directly to PVR functionality are located on PVR sidecar 1101.

In FIG. 11, IPG 904 may communicate with PVR extensions 902 via communications path 908 in set-top box 1100. IPG 904 may communicate with PVR APIs 906 via communications path 1110, which may include any wired or wireless connection. Communication between components implemented in PVR sidecar 1101 may occur via communications path 1112, which may include serial connections, parallel connections, wireless connections, any suitable method for communicating information, or any combination thereof.

Figure 12:
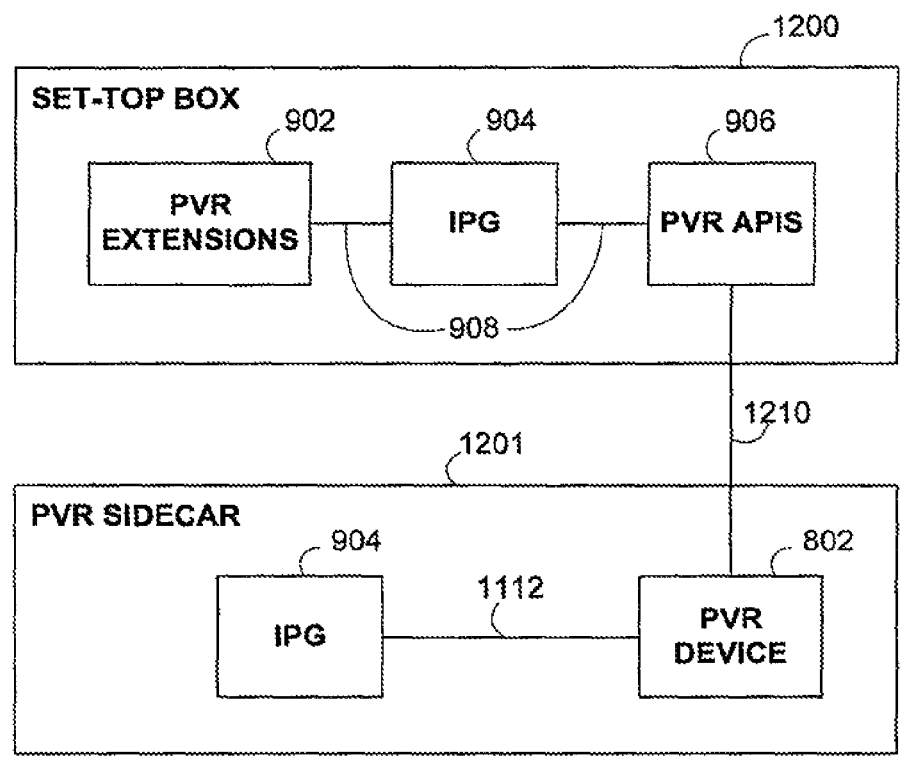

FIG. 12 shows that IPG 904 may be implemented in both set-top box 1200 and PVR sidecar 1201. In FIG. 12, the set-top version of the IPG includes PVR extensions 902 while the PVR sidecar version does not. Components in set-top box 1200 may communicate via communications path 908 while components in PVR sidecar may communicate via communications path 1112. Components in set-top box 1200 may communicate with components in PVR sidecar 1202 via communications path 1210, which may be any wired or wireless connection.

Figure 13:
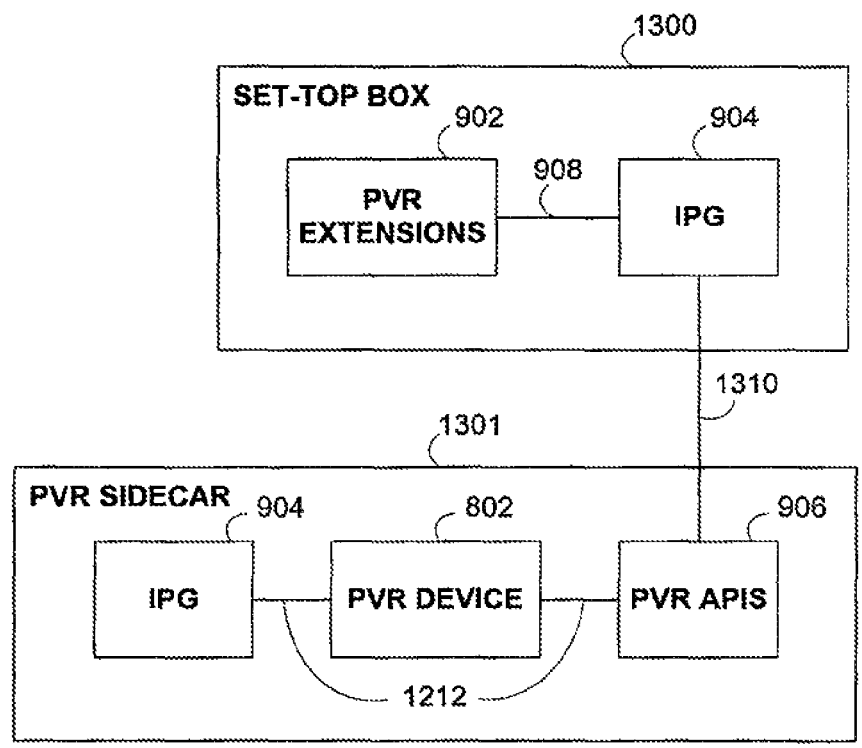

FIG. 13 shows a dual-platform arrangement of the IPG having PVR extensions 902 and IPG 904 located on set-top box 1300. A full port of IPG 904 may also be implemented in PVR sidecar 1301 along with PVR device 802 and PVR APIs 906. Components in set-top box 1300 may communicate with components in PVR sidecar 1301 via communications path 1310, which may be any wired or wireless connection.

Figure 14:
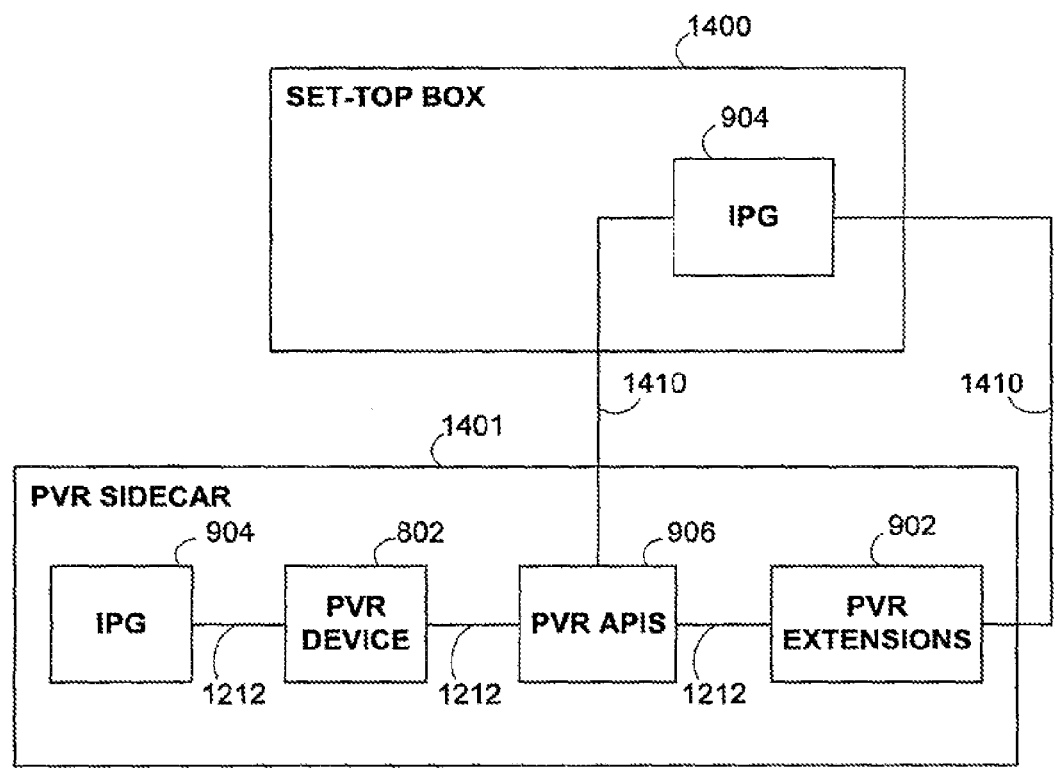

FIG. 14 shows that IPG 904 with PVR extensions 902, PVR device 802, and PVR APIs 902, may be installed in PVR sidecar 1401. Because a full port of IPG 904 exists on PVR sidecar 1401, only IPG 904 may be implemented in set-top box 1400 to communicate with the components of PVR sidecar via communications path 1410, which may be any suitable wired or wireless connection. By installing a full port of IPG on both set-top box 1400 and the PVR sidecar 1401, the application implemented in the sidecar may operate on its own or in conjunction with the application on the set-top box.

In the arrangement where the IPGs on the set-top box and PVR sidecar work in conjunction with one another, the set-top box port of the IPG may perform basic tuning functions, PPV functions, and authorization functions. The set-top box may receive out-of-band (OOB) data and may otherwise act as a pass-through for the PVR sidecar while the PVR sidecar may receive and process control commands from a remote control or any suitable user input device. A pass-through implies that, although the PVR sidecar is coupled to the set-top box, the PVR sidecar may be used as a communications medium for signals sent by the set-top box and may not provide any functionality. In this configuration, the PVR sidecar may generate all video overlays using, for example, a video overlay generator that may generate a user interface superimposed over programming being displayed.

In another suitable approach, set-top box 1400 may monitor any communication to and from PVR sidecar 1401 via communications path 1410. If PVR sidecar 1401 is not detected, the IPG may function as it does without PVR functionality, using its own port of the IPG to provide basic IPG features. If the PVR sidecar is detected, however, the IPG may support PVR functionality. If the sidecar is removed, the IPG may detect the change and function as though there is no sidecar present, causing the PVR sidecar to operate in pass-through mode.

In pass-through mode, the PVR sidecar may, for example, ignore all user commands from the IR remote control or may receive user commands and communicate them to the set-top box for execution. In pass-through mode, the PVR sidecar need not display programming or video overlays, but may rather pass this data directly from the set-top box to a display screen. In pass-through mode, the PVR sidecar may also perform passive functions such as accepting commands to purchase programming, maintaining in non-volatile memory all parental control settings, allowing parental control settings to be polled, checking whether a specific channel, rating, or title is locked, checking the validity of a parental control code or purchase code, or any other suitable function.

The IPG's PVR functions may be implemented using a set of generic PVR APIs to simplify the porting of the PVR-compliant device to the integrated set-top environment when it is available. PVR sidecar 1401 may also include a "porting layer" (not shown) that will simplify the porting of the IPG from set-top box 1400 to PVR sidecar 1401. This will be especially valuable if multiple sidecar platforms must be supported and may provide for a more seamless integration of the devices IPGs.

Figure 15:
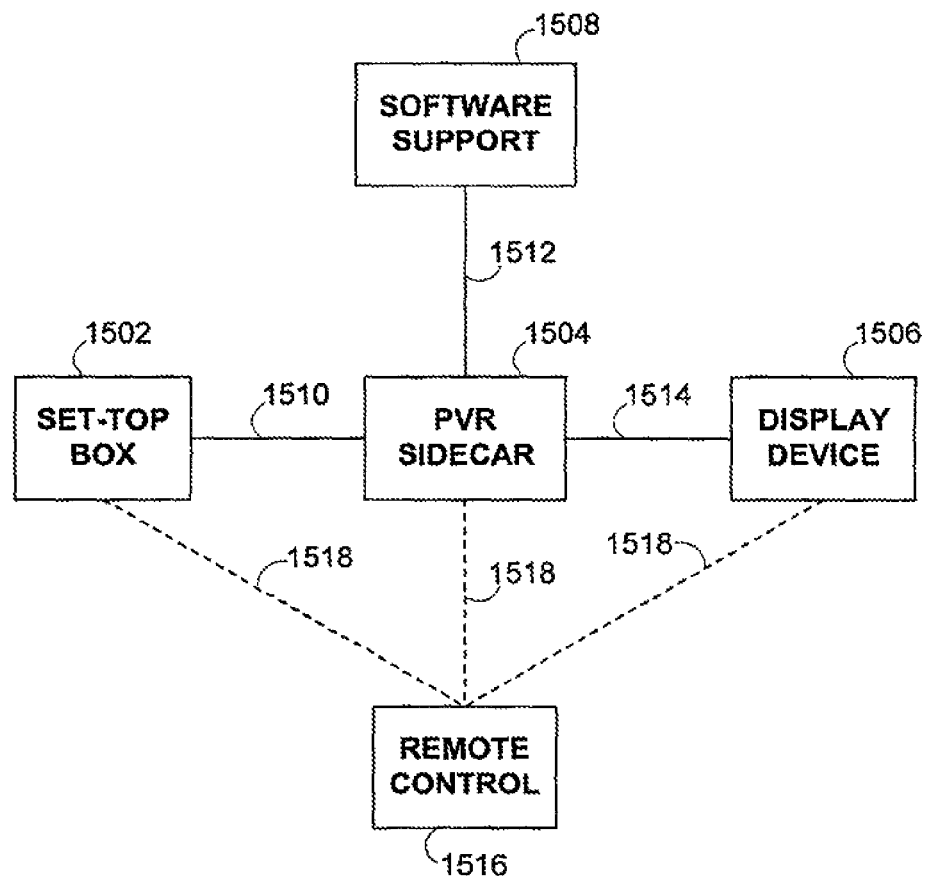
FIG. 15 is a more detailed diagram of the illustrative arrangement of the diagrams of FIGS. 9-14 in accordance with the present invention.

The PVR sidecar arrangement of FIGS. 9-14 are further illustrated in FIG. 15. Remote control 1516 may be used to operate either set-top box 1502, PVR sidecar 1504, or display device 1506. Remote control 1516 communicates commands to any of the devices via communications path 1518, which may include IR, radio waves, or any suitable means for controlling set-top box 1502 and PVR sidecar 1504 or display device 1506 with remote control 1516.

PVR sidecar 1504, set-top box 1502, or both may communicate with software support 1508 or any other remote site via communications path 1512. Software support 1508 may be for vendor-specific applications located at a remote software support site, with which the PVR-compliant device may communicate to download additional software applications, software upgrades or any other suitable component associated with the components implemented in PVR sidecar 1504, set-top box 1502, or both. Communications path 1512 may also be used to download information not specific to the PVR sidecar, such as program guide data. Communications path 1512 may be a serial connection, parallel connection, wireless connection, any other suitable connection, or any combination thereof.

PVR sidecar 1504, set-top box 1502, or both may upload user information to a remote site using communications path 1512. For example, PVR sidecar 1504 may be configured to communicate to with a remote site (such as a cable headend, distribution facility, software company, web server, or any other suitable location) information relating to a user's profile, preferred options, recorded programming, or any other information on PVR sidecar 1504 or set-top box 1502.

PVR sidecar 1504 may receive guide data from set-top box 1502 which may be passed from the IPG's data channel, such as an out-of-band (OOB) data channel. This approach may allow the system to be deployed without having to put a new data delivery infrastructure in place. The IPG data may be augmented to accommodate more data then could be supported by or would be needed by the set-top box alone (e.g., between 14 and 30 days of data, or any other suitable amount of data, may be stored). A separate data feed may be developed to support the PVR device. On a cold install, set-top box 1502 may tune to the non-PVR data channel until a sufficient amount of data is stored in local storage. The set-top may switch (under command from the sidecar) to the PVR feed. After a power outage, the set-top may tune immediately to the PVR feed because of data cached on the disk drive.

In certain arrangements, set-top box 1502 and PVR sidecar 1504 may communicate information using IR commands. For example, set-top box 1502 may receive an indication via an IR command from remote control 1516. Set-top box 1502 may then communicate the IR command to PVR sidecar 1504 via its own IR command. IR commands may be relayed from remote control 1516 to set-top box 1502 via PVR sidecar 1504 in other arrangements. In additional arrangements, IR commands may be sent to and from PVR sidecar 1504 and set-top box 1502 that do not originate from remote control 1516.

In the embodiment using the PVR sidecar, the PVR sidecar, set-top box, or both may also include third party applications to enable specific functionality or obtain a higher level of performance. Various classes of such third party applications may be used in conjunction with the PVR device. For example, applications may be independent of real-time video, or be time-dependant and rely on real-time video. These applications may be implemented in set-top box 1502 and launched by the IPG on PVR sidecar 1504 using commands sent over communications path 1510, which may be any suitable wired or wireless connection. When one of these applications launches, it may send a command to PVR device 802 (FIG. 8) to disable its functions. While that application is running, the sidecar may act in a pure pass-through mode.

Figure 16:
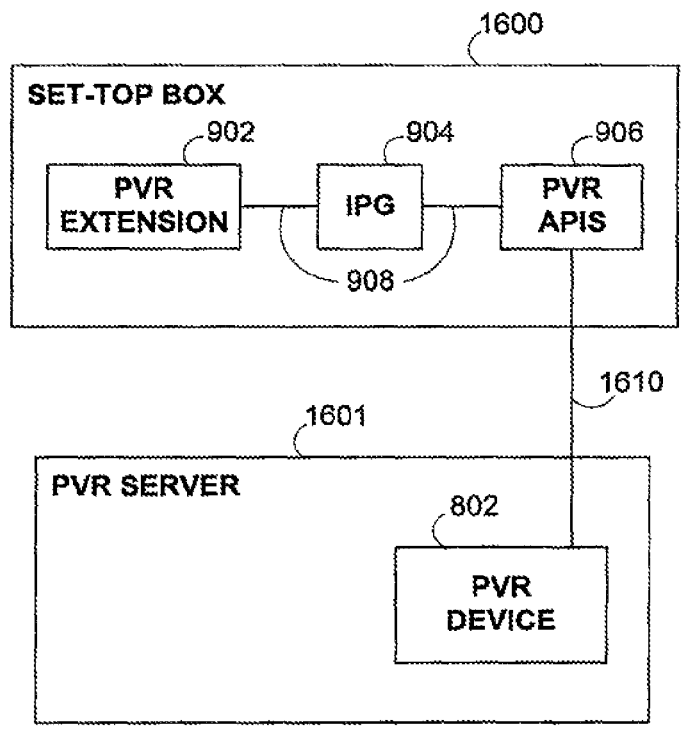
FIGS. 16-18 are diagrams of illustrative arrangements for implementing a PVR device using a PVR server in accordance with the present invention.
Figure 17:
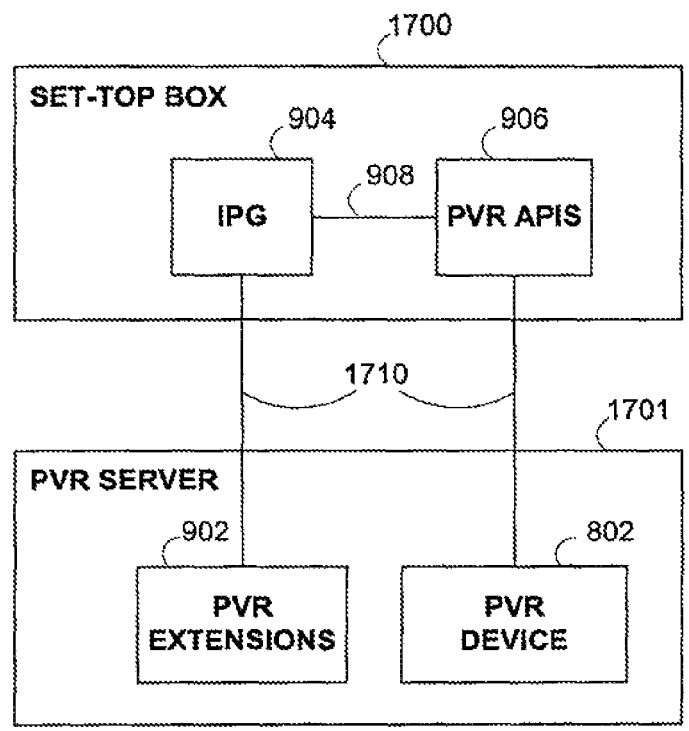
Figure 18:
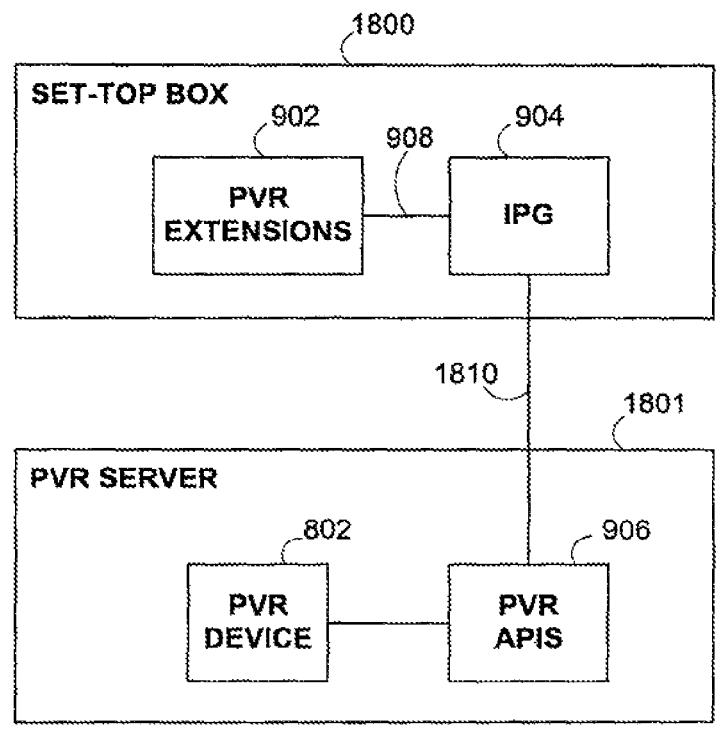

In another embodiment of the present invention a PVR server may be used to implement PVR functionality as illustrated in FIGS. 16-18. The PVR server may be located in any remote location, for example a cable headend, a distribution facility (such as distribution facility 110), or a main facility (such as main facility 102). The PVR server may be a mainframe computer, web server, network node, or any suitable device or devices for providing information over a network. The PVR server may be provided by, for example, a programming source or a third party service provider such as an application service provider (ASP). The PVR server may provide PVR functionality to more than one set-top box. While it is desirable for PVR servers to serve set-top boxes in similar locations (to reduce latency and enhance the rate of communication between the set-top and the server), it is not necessary for a server to serve only a specific location since PVR functionality may be identical over various geographic areas.

In FIG. 16, PVR device 802 may be provided by PVR server 1601 while all other devices (e.g., IPG 904 having PVR extensions 902 and PVR APIs 906) may be located on set-top box 1600. IPG 904 may communicate with PVR APIs 906 via communications path 908. PVR APIs 906 may communicate with PVR device 802 via communications path 1610, which may include a wired connection, a wireless connection, or any suitable combination of connections. In FIG. 16, the user's local equipment (e.g. set-top box 1600) includes all hardware and software needed to interact with PVR device 802, which provides PVR functionality from a remote location. This arrangement is desirable because it offers users of set-top box 1600 the ability to easily integrate PVR functionality to their existing set-top box by providing plug and play functionality from PVR server 1601.

In FIG. 17, both IPG 904 and PVR APIs 906 are implemented in set-top box 1700 while PVR device 802 and PVR extensions 902 are implemented in PVR server 1701. IPG 904 may communicate with PVR extensions 902 and PVR APIs 906 may communicate with PVR device 802 via communications paths 1710, which may include a wired connection, a wireless connection, or any suitable combination of connections. This arrangement may be found desirable because it equips the user with substantially all IPG components needed to communicate with PVR device 802 and PVR extensions 902.

In another suitable arrangement, as shown in FIG. 18, IPG 904 having PVR extensions 902 may be implemented in set-top box 1800. IPG 904 may communicate with PVR APIs 906 on PVR server 1801 via communications path 1810, which may include a wired connection, a wireless connection, or any suitable combination of connections. This arrangement may be found desirable because substantially all components directed to providing integration of the PVR application are implemented in set-top box 1800 while substantially all components relating to the PVR functionality are located on PVR server 1801.

Figure 19:
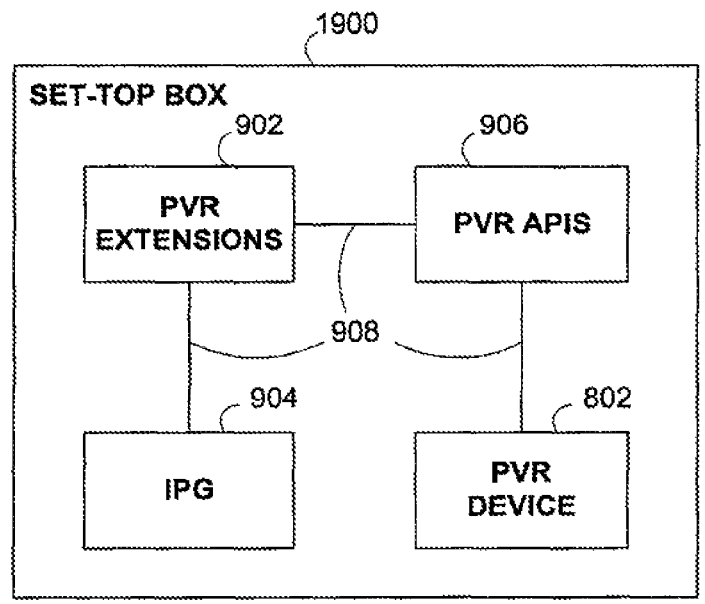
FIG. 19 is a diagram of an illustrative arrangement for implementing a PVR device using an integrated set-top box in accordance with the present invention.

In another embodiment of the present invention, shown in FIG. 19, the PVR device may be incorporated directly into an integrated unit such as set-top box 1900. In this arrangement, the PVR capability is available directly to the set-top box and no additional PVR equipment or communication paths may be needed to implement PVR device 802 to set-top box 1900. To support the integrated unit, the IPG may communicate with PVR APIs 906 to issue PVR-related commands. PVR APIs 906 may be implemented as a separately downloadable module that may communicate with PVR device 802 located on set-top box 1900. As with the other embodiments, communication occurs between PVR APIs 906 and IPG 904 having PVR extensions 902. Components implemented in set-top box 1900 may communicate via communications path 908, which may include a serial connection, parallel connection, wireless connection, any other suitable connection, or any combination thereof.

Figure 20:
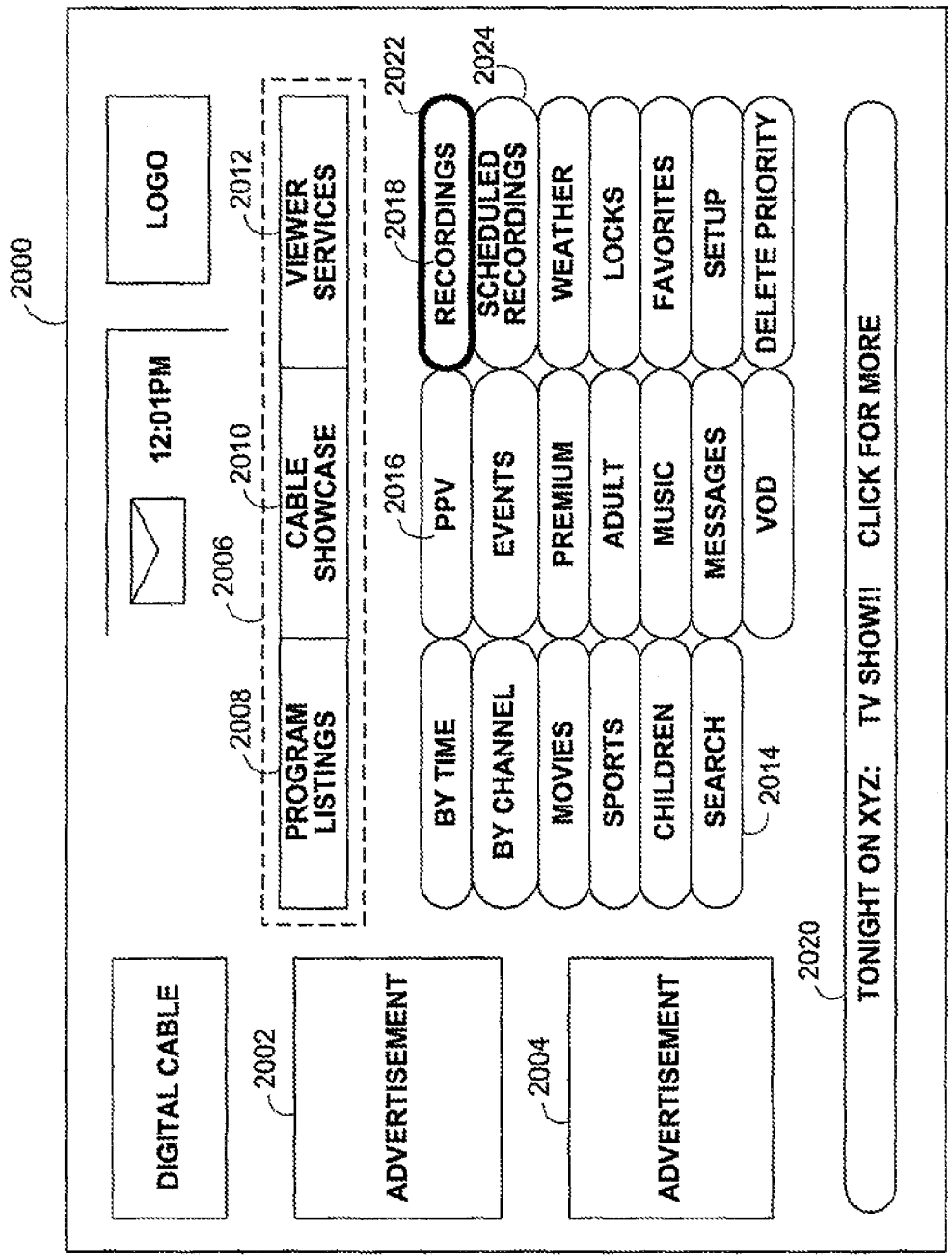
FIGS. 20-22 show illustrative display screens for recording programs in accordance with the present invention.

By implementing PVR functionality to a PVR-compliant system in one of the foregoing manners, the IPG with PVR extensions may provide display screens with embedded PVR functions such as main menu display screen 2000 of FIG. 20. Main menu display screen 2000 may include various menu headings, such as program listings heading 2008, cable showcase heading 2010, and viewer services heading 2012. Program listings heading 2008 may be a heading for options relating to searching for or displaying program listings, such as search option 2014. Cable showcase heading 2010 may be a heading for options that are available from the cable provider, such as PPV option 2016. Viewer services heading 2012 may be a heading for options that provide various interactive services, such as PVR services, to a user. Such options may include recordings option 2018, scheduled recordings option 2024, and setup option 2026. Display screen 2000 may include advertisement 2002, 2004, and 2020 which may be used to promote any suitable program, product, event, reminder, or service, and may be selected by the user.

Main menu display screen 2000 may be provided by the IPG until the user selects an option such as an option from viewer services menu 2012 that may involve PVR functionality, for example recordings option 2018. In the embodiment where a set-top box is coupled to a PVR sidecar, the user may interact with main menu display screen 2000 using the IPG implemented in the set-top box. When the user selects recordings option 2018, the IPG may send a request for a display screen associated with the user's request to the PVR extensions, which may be provided by the set-top box or the PVR sidecar. The PVR extensions may then provide the IPG with a display screen associated with the user's request. If the PVR extensions are provided by the PVR sidecar, a communications path may be used for communications between the set-top box and the PVR sidecar. The IPG working in conjunction with the PVR extensions may provide the user with PVR functionality and information provided by a PVR device implemented in the PVR sidecar.

In one suitable arrangement, a full port of the IPG may be implemented in the set-top box, the PVR sidecar, or both. In this arrangement, display screens 2000, 2100 and 2200 may be provided by the PVR sidecar IPG while the set-top box IPG may perform functions in support of the PVR sidecar (i.e. managing PPV services).

In the embodiment using a PVR server, the IPG on the set-top box may send a request to the PVR extensions provided by the set-top box or the PVR server in response to the user selecting an option from viewer services menu 2012, such as recordings option 2018. The PVR extensions may then provide the IPG with a display screen associated with the user's request. If the PVR extensions are provided by the PVR server, a communications path may be used for communications between the set-top box and the PVR server. The IPG working in conjunction with the PVR extensions may provide the user with PVR functionality and information provided by a PVR device implemented in the PVR server.

In the embodiment using an integrated set-top box, both the IPG and the PVR extensions may be implemented in the set-top box. The IPG may send a request to the PVR extensions in response to the user selecting an option from viewer services menu 2012 such as recordings option 2018. The PVR extensions may then provide the IPG with a display screen associated with the user's request.

Figure 21:
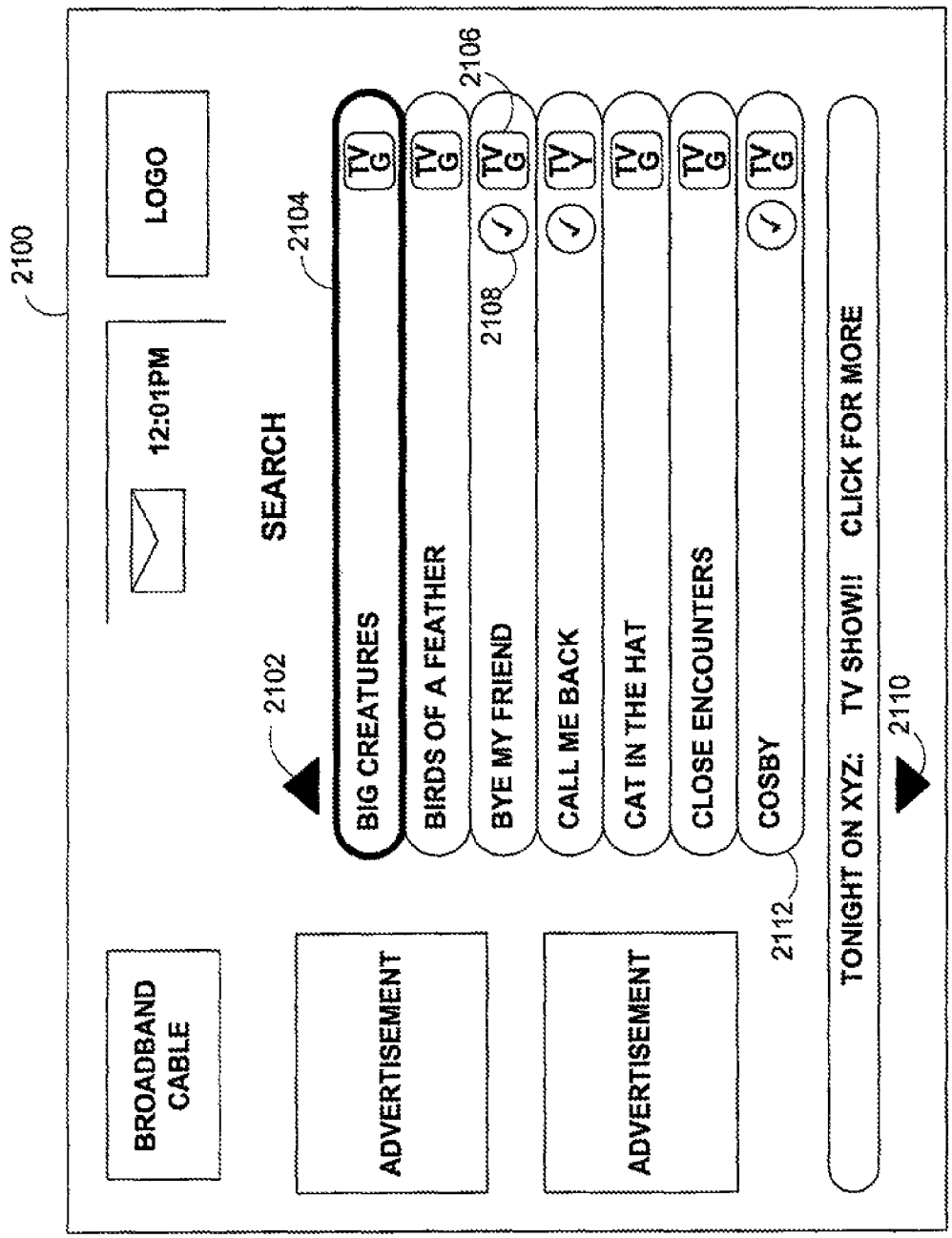

In a similar manner, search display screen 2100 of FIG. 21 may be provided by only the IPG until a user indicates a desire to record a given program using a PVR. In FIG. 21, the user may search for programs in a format provided by the IPG. Any navigational feature, for example, up and down arrow keys on the remote control, as indicated by scroll up indicator 2102 and scroll down indicator 2110, may be used to navigate the program listings menu. Each program listing 2112 may include a program rating 2106 and a recording indicator 2108 that shows whether a program is scheduled to be recorded. The user may record a program with the PVR device by highlighting and selecting a program 2104.

Search display screen 2100 may be partially provided by the PVR device. For example, the program listings may include listings for both scheduled programs and recorded programs. The listings for the scheduled programs may be provided by the set-top box, and the listings for the recorded programs may be provided by the PVR device. The listings may include programs scheduled to be recorded, including an indication that they are to be recorded. The indication may be stored on the PVR device, and the set-top box may use the PVR device as a storage device to store program listings.

While interacting with search display screen 2100, the user may indicate a desire to record the given program using the IPG or an input device such as remote control 408 of FIG. 4. When the user indicates a desire to record a program, the IPG may request a display screen from the PVR extensions that corresponds to the user's selection. The PVR extensions implemented in the set-top box, PVR sidecar, or PVR server may provide the IPG with display screens corresponding to the user's indication. If the PVR extensions are provided by a PVR sidecar or server, a communications path may be used for communications between the IPG and the PVR extensions. The IPG working in conjunction with the PVR extensions may provide the user with PVR functionality and information provided by a PVR device.

Figure 22:
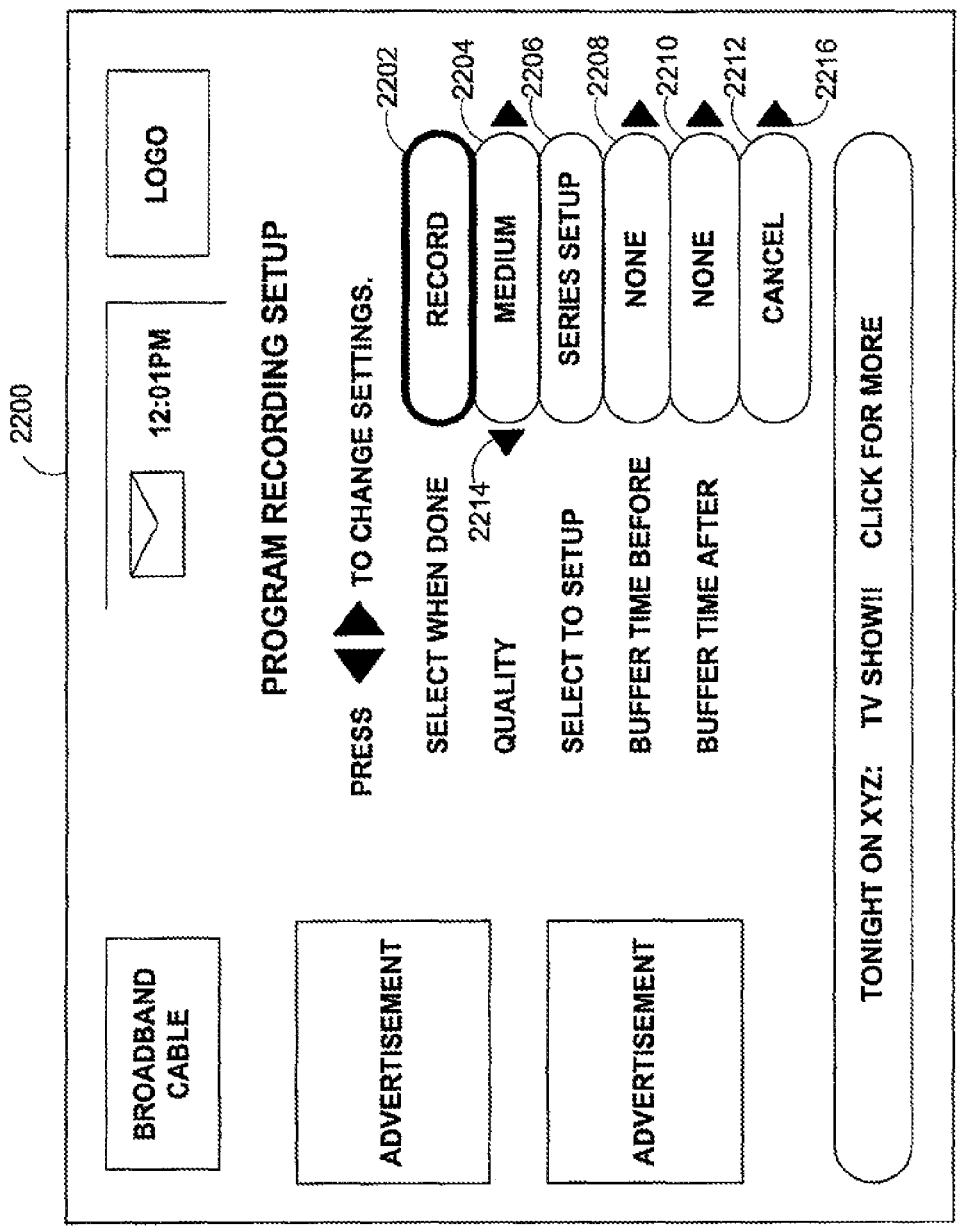

For example, the PVR extensions may provide the IPG with recording setup screen 2200, shown in FIG. 22, in response to the user selecting a program provided by the IPG (FIG. 21) or in response to the user selecting a record option from remote control 408 (FIG. 4). Display screen 2200 may provide the user with the ability to set or modify various recording settings, including the ability to schedule one-time and series recordings. Record option 2202, quality option 2204, series setup option 2206, buffer time before option 2208, buffer time after option 2210, and cancel option 2212 may be provided on display screen 2200.

The user may modify the selected options by using left and right arrow keys on the remote control as indicated by scroll left 2214 and scroll right 2216 indicators. The user may select record option 2202 after modifying the various options available or may cancel the recording at any time by selecting cancel option 2212. If desired, the IPG may provide the user with the ability to set a manual recording by specifying a channel, date and time, and duration to record (not shown).

Recording setup display screen 2200 may be provided by an IPG working in conjunction with PVR extensions. The IPG may provide a seamless look and feel to the display screen while the PVR extensions may provide the selectable options. When the user submits finalized options to be recorded from recording setup display screen 2200, the IPG with PVR extensions may send a command to be executed by a PVR device. If the user selects to record a program that will occur at a later time, the IPG with PVR extensions may delay sending the command to the PVR device, or the PVR device may delay executing the command until the program occurs. PVR APIs may be used to facilitate communications between the IPG with PVR extensions and the PVR device.

The PVR device may be implemented in a PVR sidecar, PVR server, or an integrated set-top box. If located in a PVR server or sidecar, the PVR device may receive requests and provide functionality to the IPG and PVR extensions over a communications path via PVR APIs. Once the user selects record option 2202 and returns to screen 2100 of FIG. 21, scheduled recording indicator 2108 may appear for the listing the user has selected to record. The IPG may also provide the ability to initiate a recording from any program information screen by selecting the record option from a display screen provided at least partially by the PVR extensions, or by using a remote control such as remote control 408 (FIG. 4).

Figure 23:
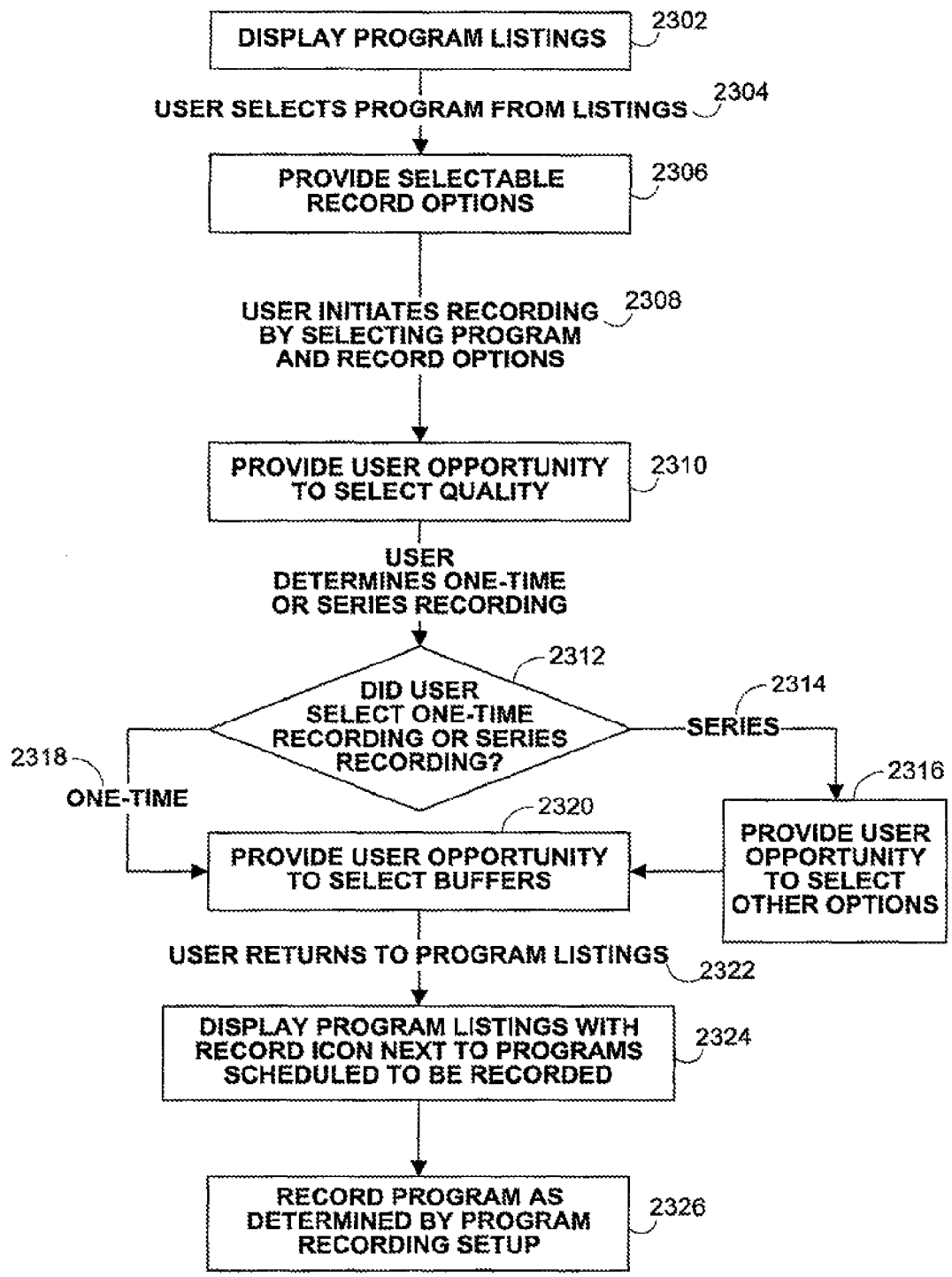
FIGS. 23-24 are flow-charts of illustrative steps involved in recording programs using a PVR system in accordance with the present invention.

FIG. 23 is a flowchart of illustrative steps involved in providing the user with the ability to record programs using a personal video recorder application in conjunction with the PVR system of the present invention. According to this process, the PVR-compliant device may display program listings or other screen at step 2302, providing the user an opportunity to setup a recording. In response to the user initiating a recording setup from the program listings or other screen at step 2304, the system may provide the user with selectable record options at step 2306. The user may then initiate recording by selecting record options at step 2308.

The PVR-compliant device may allow the user to select quality at step 2310. The user may be able to select one of several recording qualities to control the amount of storage space required for recorded programs. For example, if the user selects higher quality more recording storage space may be required to record an individual program. By selecting lower recording quality, the user may be able to record more hours of programming in the same amount of storage space.

The user may then determine if the recording is a one-time or series recording at step 2312. A one-time recording may record a single occurrence of a program while a series recording may record all occurrences of the program. If the user selects a one-time recording 2318, the PVR-compliant device may then provide the user an opportunity to select the program buffers at step 2320. If the user selects a series recording 2314, the PVR-compliant device may first provide the user an opportunity to select other options at step 2316 before providing the user opportunity to select program buffers at step 2320. The additional options for a series recording may include the number of programs to keep on the PVR device, the channels to include in the recording (e.g., all channels or just a specific channel), etc.

Program buffers may be placed at the beginning and end of the scheduled program to ensure the entire program is recorded. The length of the buffer(s) may be selected by the user at step 2320. To help the viewer compensate for slight variations in broadcast times, the system may allow the viewer to specify an amount of time before and after the program to extend the recording time. For example, if the viewer knows that a program they watch regularly begins broadcasting two-minutes before the hour, the viewer may tell the IPG to begin recording two-minutes prior to the program's air-time to compensate for the early broadcast of the program. A detailed illustration of steps involved in applying buffers is later discussed in FIG. 24.

When the user returns to the program listing at step 2322, the system may display program listings or other screen with record icons next to the programs that are scheduled to be recorded at step 2324. The recording process depicted in FIG. 23 may culminate when the system records the program as it occurs at step 2326.

It will be understood that the steps of the process depicted in FIG. 23 may be performed in any suitable order. However, for the purpose of brevity and clarity, only one illustration of the process is provided.

The PVR extensions have been designed to allow the viewer to initiate a recording with a single remote command anywhere a program appears in the IPG or while watching a program with no IPG screens or overlays. For example, the viewer may initiate a recording from a program listing screen, browse screen, flip bar, or program information screen simply by pressing the record key on the remote control (not shown).

When the viewer presses the record key while a program is selected on the user interface, the IPG may initiate a one-time recording and display an icon next to the program title indicating that a recording is currently scheduled for the program. Whenever the program listing appears on a display screen, the IPG may place the recording option next to the program title.

Figure 24:
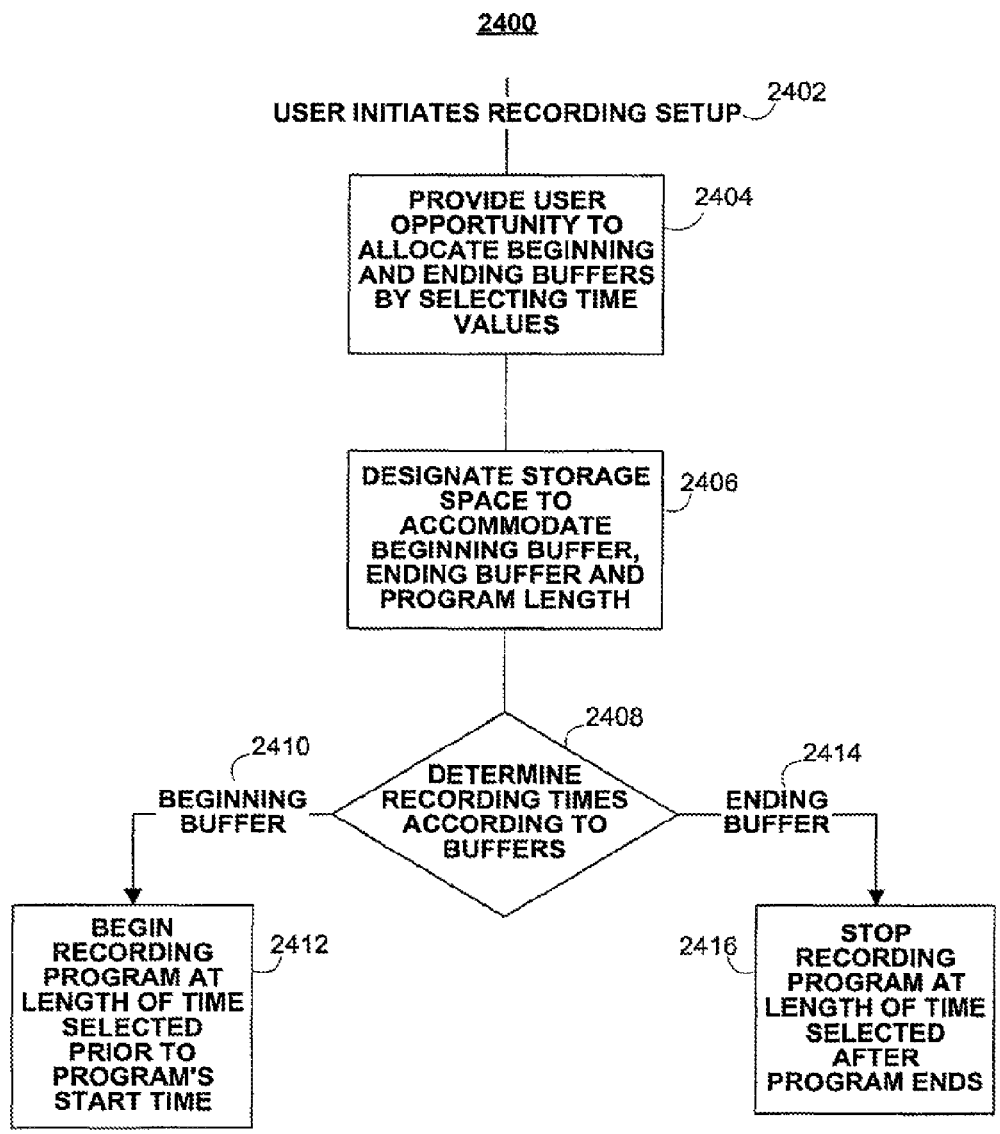

FIG. 24 is a flowchart of illustrative steps involved in selecting buffers when recording a program in conjunction with the PVR system of the present invention. To apply the buffers selected by the user, more storage space may be allocated for recording the program. The PVR-compliant device may begin recording the program at a time earlier than the scheduled program start time as specified by the user. The PVR-compliant device may stop recording the program at a time later than the scheduled program end time as specified by the user.

In response to the user initiating recording setup 2402, the system may provide the user an opportunity to allocate beginning and ending program buffers by selecting a time value in step 2404. In step 2406, the system may allocate the appropriate amount of storage space to accommodate the length of the buffers and the program being recorded. The system may then determine the time of recording in step 2408. In applying the beginning buffer 2410, the system may begin recording the program at the length of time selected by the user prior to the program's scheduled start time in step 2412. To apply the ending buffer 2414, the system may stop recording the program at the length of time selected by the user after the program is scheduled to end in step 2416.

Figure 25:
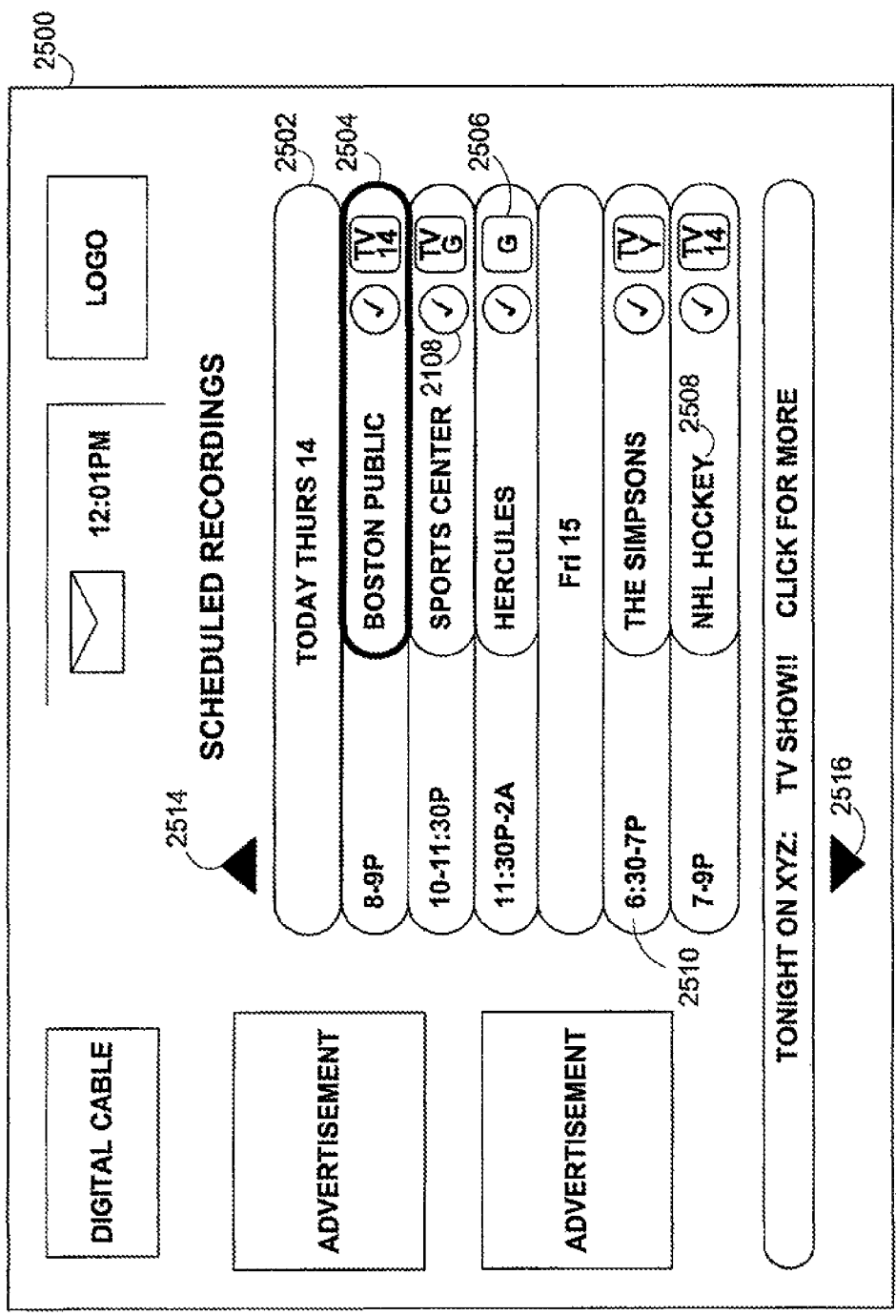
FIG. 25 shows an illustrative display screen for accessing scheduled recordings in accordance with the present invention.

FIG. 25 shows display screen 2500 that comprises a list of scheduled recordings indicating the time the program is to occur 2510, the title of the program 2508, recording indicator 2108, rating 2506 and the date 2502. An IPG working in conjunction with PVR extensions may provide scheduled recordings display screen 2500. The user may navigate the list of scheduled recordings by using scroll up and scroll down keys on the remote control, as indicated by the scroll up 2514 and scroll down 2516 indicators. The user may select a program to view or edit the detailed information by selecting the program 2504. If the user selects a program that is scheduled to be recorded, the IPG may send a request to the PVR extensions to display a screen corresponding the users request or the IPG may display the screen and may use information retrieved by the PVR device.

Information may be provided to the IPG with PVR extensions by sending a request for information to a PVR device via PVR APIs. The PVR device may be located in, for example, an integrated set-top box, a PVR sidecar, or a PVR server. In response to receiving a request from the IPG and PVR extensions via PVR APIs, the PVR device may provide a list of programs scheduled to be recorded. The PVR device may also provide such information to designate each program scheduled to be recorded in the IPG with recording indicator 2108. In some embodiments, the IPG may store the information on programs to be recorded without using the PVR device.

Figure 26:
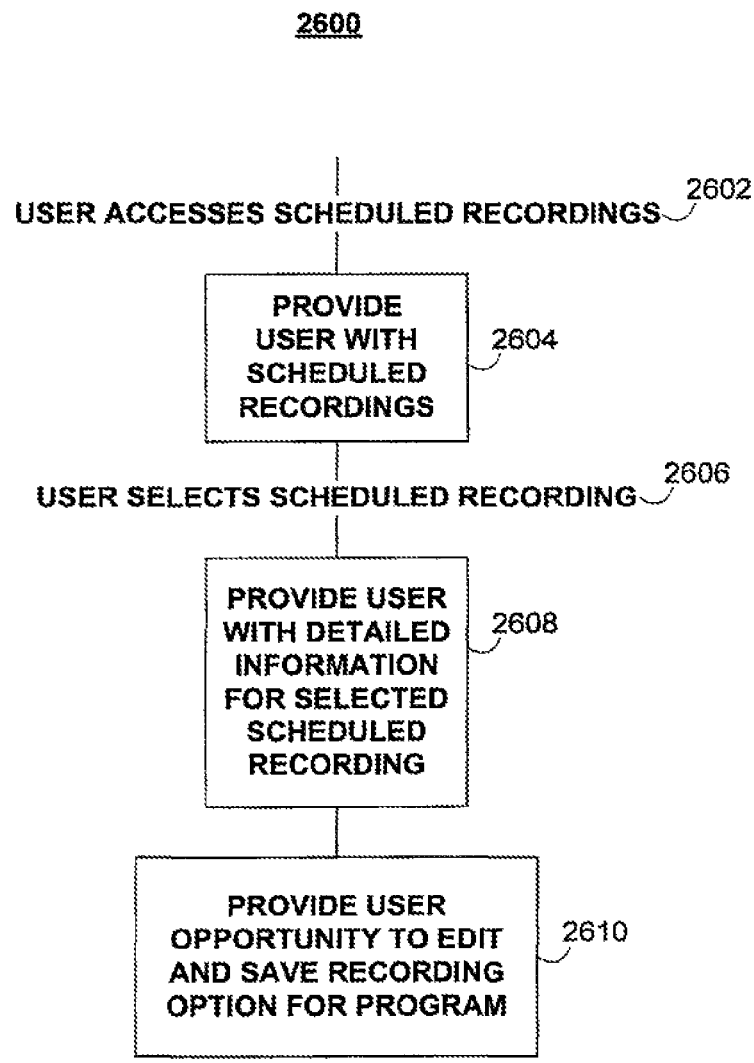
FIG. 26 is a flow-chart of illustrative steps involved in accessing scheduled recordings in accordance with the present invention.

FIG. 26 is a flowchart of illustrative steps involved in providing the user with the ability to manage programs that are scheduled to be recorded using a personal video application in conjunction with the PVR system of the present invention. According to this process, the user may indicate a desire to access a list of scheduled recordings 2602, at which point the PVR-compliant device may display the scheduled recordings in step 2604. Detailed information may then be displayed in step 2608 in response to the user selecting a scheduled recording to manage 2606. The PVR-compliant device may then provide the user an opportunity to edit and save recording options for the program in step 2610, after which the PVR-compliant device may save the changes made by the user.

The PVR-compliant device may provide access to scheduled recordings through a button on the main menu of the IPG. When the viewer wishes to modify the options for a scheduled recording or determine what recordings are scheduled, the viewer may access the scheduled recordings list such as the one depicted in FIG. 25, from the IPG main menu (FIG. 20). Scheduled recordings may be shown on any listing screen or other IPG screen. Scheduled recordings may also be incorporated into a reminder list (FIG. 30), which may be displayed whenever a reminder is executed.

Figure 27:
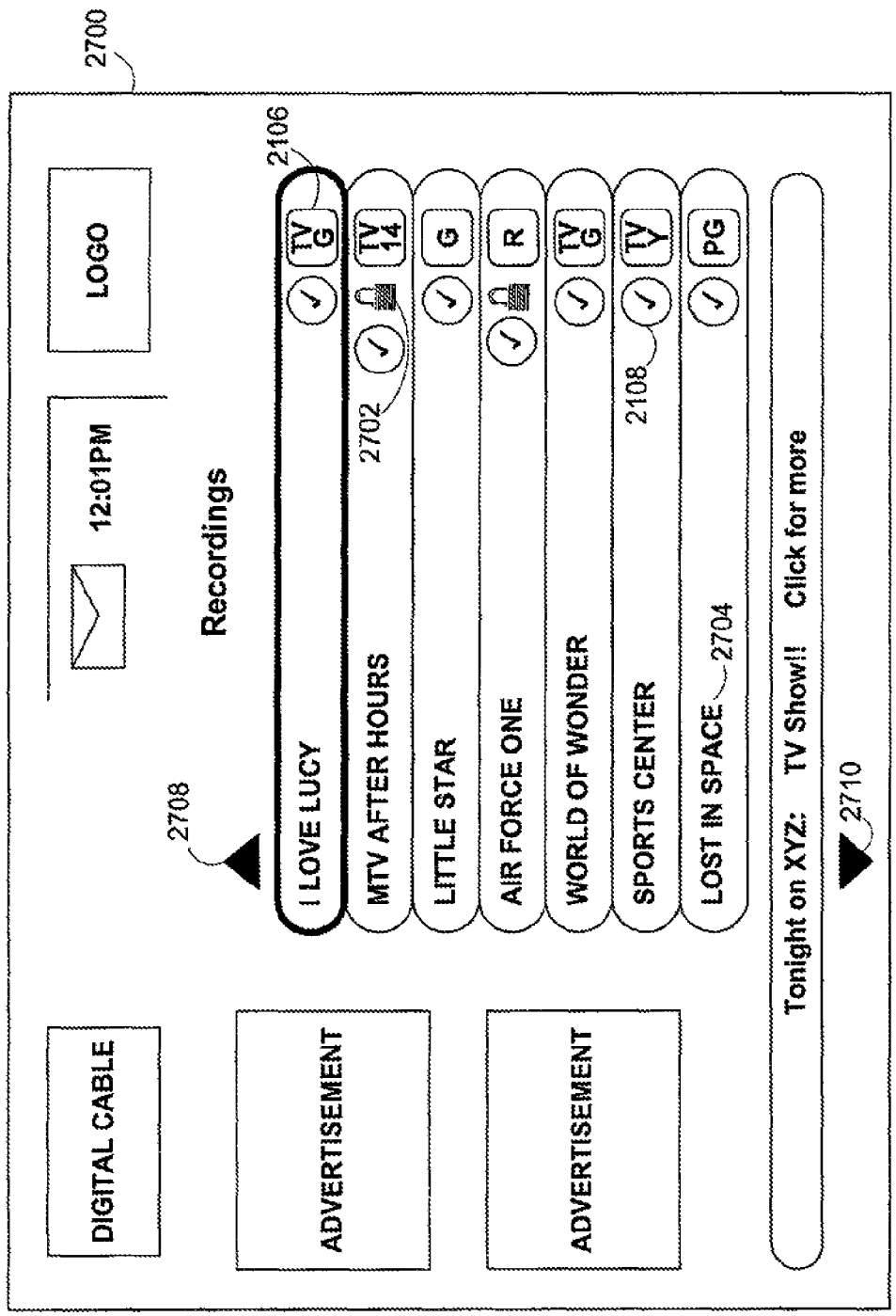
FIGS. 27-28 show illustrative display screens for accessing and viewing recorded programs in accordance with the present invention.

Once a program has been recorded by the PVR device, the IPG may provide recordings screen 2700, shown in FIG. 27, by working in conjunction with PVR extensions. The user may access recordings screen 2700 by interacting with main menu screen 2000 (FIG. 20) provided by the IPG or by some other technique using, for example, remote control 408 (FIG. 4).

In another suitable approach (not shown), the list of recorded programs in display screen 2700 may be combined with the list of programs scheduled to be recorded in display screen 2500. The list of recorded programs and programs scheduled to be recorded may be further supplemented with all program listings that are scheduled to be presented by the IPG. Providing such integrated lists of programs may be an added convenience for the user.

Recordings screen 2700 may include a list of recorded programs 2704 that the user may select. Screen 2700 may present security icon 2702 to indicate that the listed program may only be viewed by certain users or by entering a control code. Users or control criteria may have been identified while the user modified other options 2316 in the recording setup process (FIG. 23). Television rating 2106 and scroll indicators 2708 and 2710 may again be provided to facilitate user interaction with screen 2700.

The user may view a previously recorded program by selecting the program from recordings display screen 2700. The IPG may send a request to the PVR extensions upon receiving indication from the user to view a recorded program and the PVR extensions may provide a display screen consistent with the user's indication. If desired, listings for recorded programs may be shown on other IPG screens.

In the embodiment where a set-top box is coupled to a PVR sidecar, the user may interact with recordings display screen 2700 using an IPG provided by the set-top box and PVR extensions provided by either the set-top box or the PVR sidecar. When the user selects a recording to view, the IPG and PVR extensions may send a request to a PVR device provided by the PVR sidecar to present the recording requested by the user. PVR APIs and a communications path between the set-top box and the PVR sidecar may be used to facilitate communications between the IPG, PVR extensions and the PVR device. Other embodiments may include an IPG provided wholly or partially by the PVR sidecar.

In the embodiment where a set-top box is coupled to a PVR server, the user may interact with recordings display screen 2700 using an IPG provided by the set-top box and PVR extensions provided by either the set-top box or the PVR server. When the user selects a recording to view, the IPG and PVR extensions may send a request to a PVR device provided by the PVR server to present the recording requested by the user. PVR APIs and a communications path between the set-top box and the PVR server may be used to facilitate communications between the IPG, PVR extensions, and the PVR device. Other suitable embodiments may include an IPG provided wholly or partially by the PVR server.

In the embodiment where an integrated set-top box is used, the user may interact with recordings display screen 2700 using an IPG and PVR extensions provided by the set-top box. When the user selects a recording to view, the IPG and PVR extensions may send a request to a PVR device provided by the set-top box to present the recording requested by the user. PVR APIs may be used to facilitate communications between the IPG, PVR extensions and the PVR device.

Figure 28:
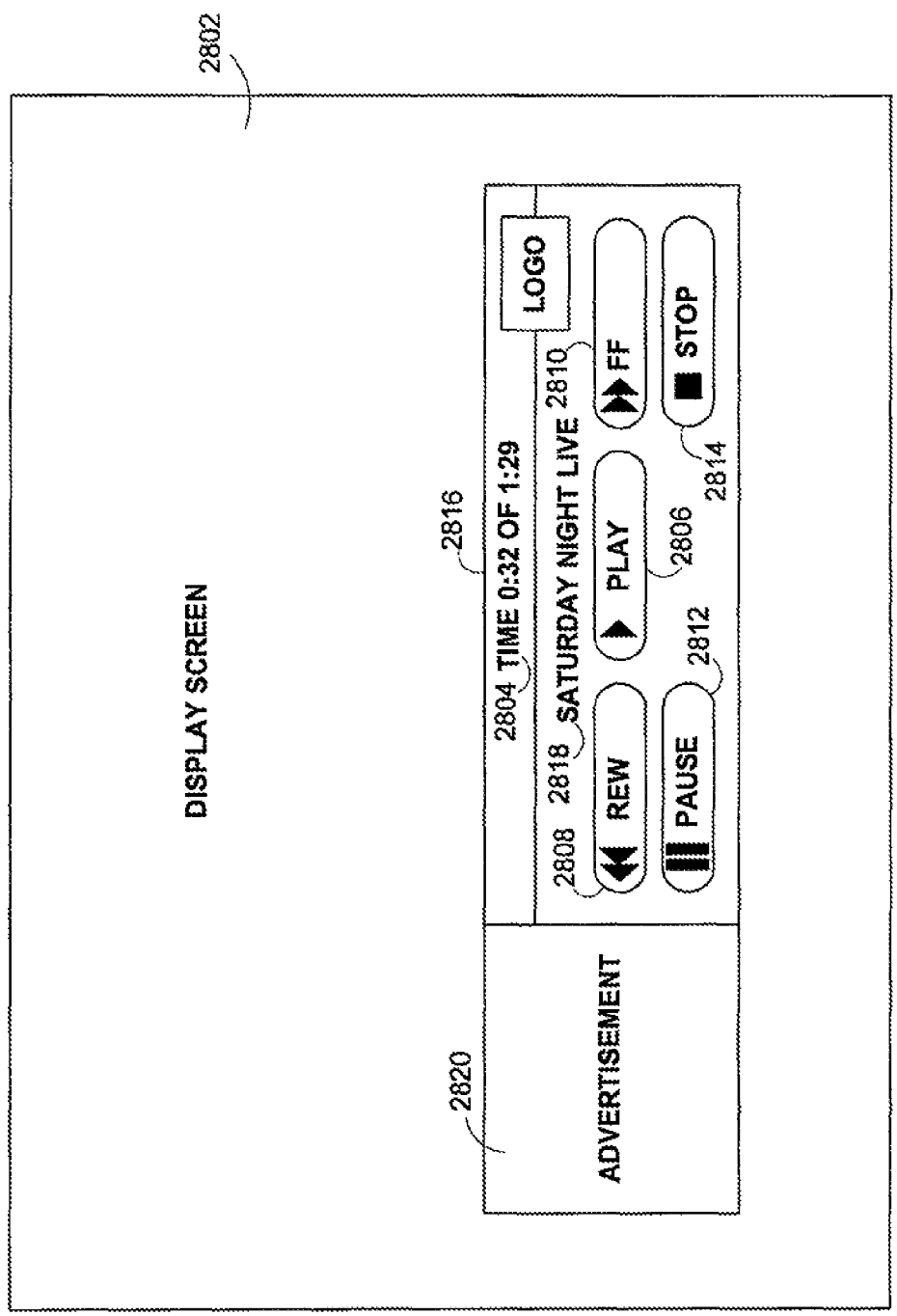

In any of these embodiments, in response to the IPG's request to present a recording, the PVR device may generate a presentation of the recording in display screen 2802 of FIG. 28. The PVR device may generate the presentation using software, hardware, or both provided by the set-top box, PVR device, display screen, any suitable device, or a combination thereof. If the PVR extensions are provided by a PVR sidecar or server, a communications path may be used to communicate the recording presentation to the display screen.

Video content of a recorded program may be provided by the PVR device and displayed in display screen 2802 of FIG. 28. A playback indicator, such as flip bar 2816, may be presented to provide the user an ability to control the recording playback. The title 2818 and time 2804 of the recorded program being displayed may also be presented by flip bar 2816, which may also include advertisements 2820. VCR-type features may be presented such as play option 2806, stop option 2814, fast forward option 2810, rewind option 2808, and pause option 2812. Playback of the recorded program may be controlled using typical VCR controls on a remote control (FIG. 4).

It will be understood that the playback indicator may be smaller than flip bar 2816 and may not include all components illustrated in FIG. 28. For example, the playback indicator may be provided without advertisements and with a smaller area for providing a limited number of playback controls. A smaller, modified playback indicator may be preferable to users because less of the program being presented will be covered by the playback indictor.

The user may interact with the playback control functions using the IPG with PVR extensions or the remote control. The IPG may send commands to the PVR device based on the user's indication. For example, the user may pause the playback of a recorded program by selecting pause option 2812 on flip bar 2816 or by selecting pause button 440 on remote control 408 (FIG. 4). Upon receiving indication from the user to pause the playback of the recorded program, the IPG with PVR extensions may send a pause command to be executed by the PVR device. The PVR device may then suspend providing the presentation of the recorded program to display screen 2802. When the user selects to continue viewing the recorded program, by interacting with, for example, flip bar 2816 or remote control 408, the IPG with PVR extensions may send a command to the PVR device to continue providing the recorded program. Upon receipt of the IPG's command, the PVR device may execute the command and continue providing the recorded program to display screen 2802.

Figure 29:
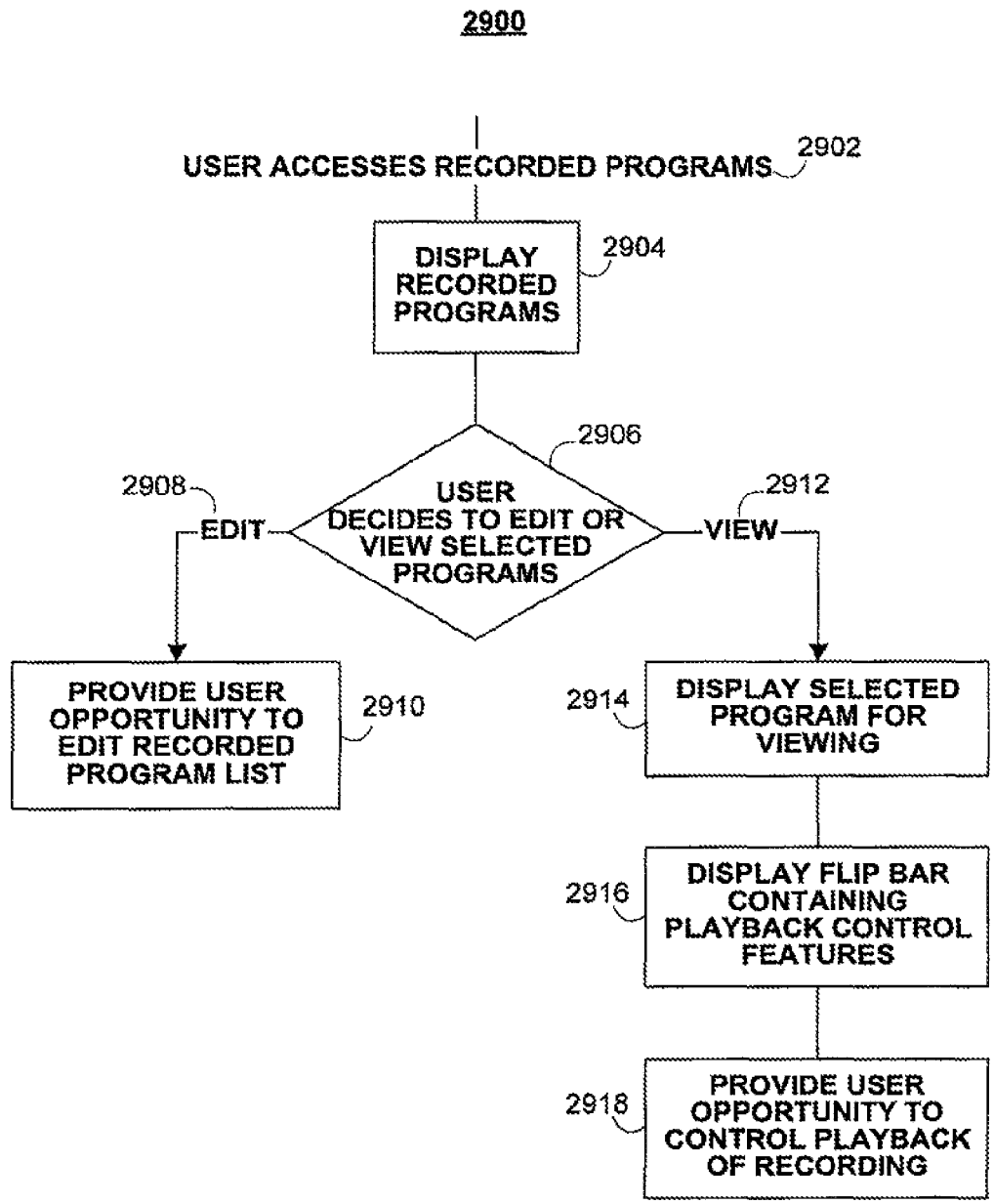
FIG. 29 is a flow-chart of illustrative steps involved in accessing and viewing recorded programs using a PVR system in accordance with the present invention.

FIG. 29 is a flowchart of illustrative steps involved in providing the user with the ability to view recorded programs using a personal video application in conjunction with the PVR system of the present invention. The process begins with the user accessing recorded programs 2902 and the system displaying listings for recorded programs in step 2904. The user must determine whether to edit program options related to the stored recording or view the stored recording in step 2906. The user may also edit the program list (e.g., delete recordings) at step 2910. If the user elects to view a recorded program 2912, the system may display a selected program for viewing at step 2914, display a flip bar including playback control features in step 2916, and provide the user an opportunity to control playback of the recording at step 2918.

Figure 30:
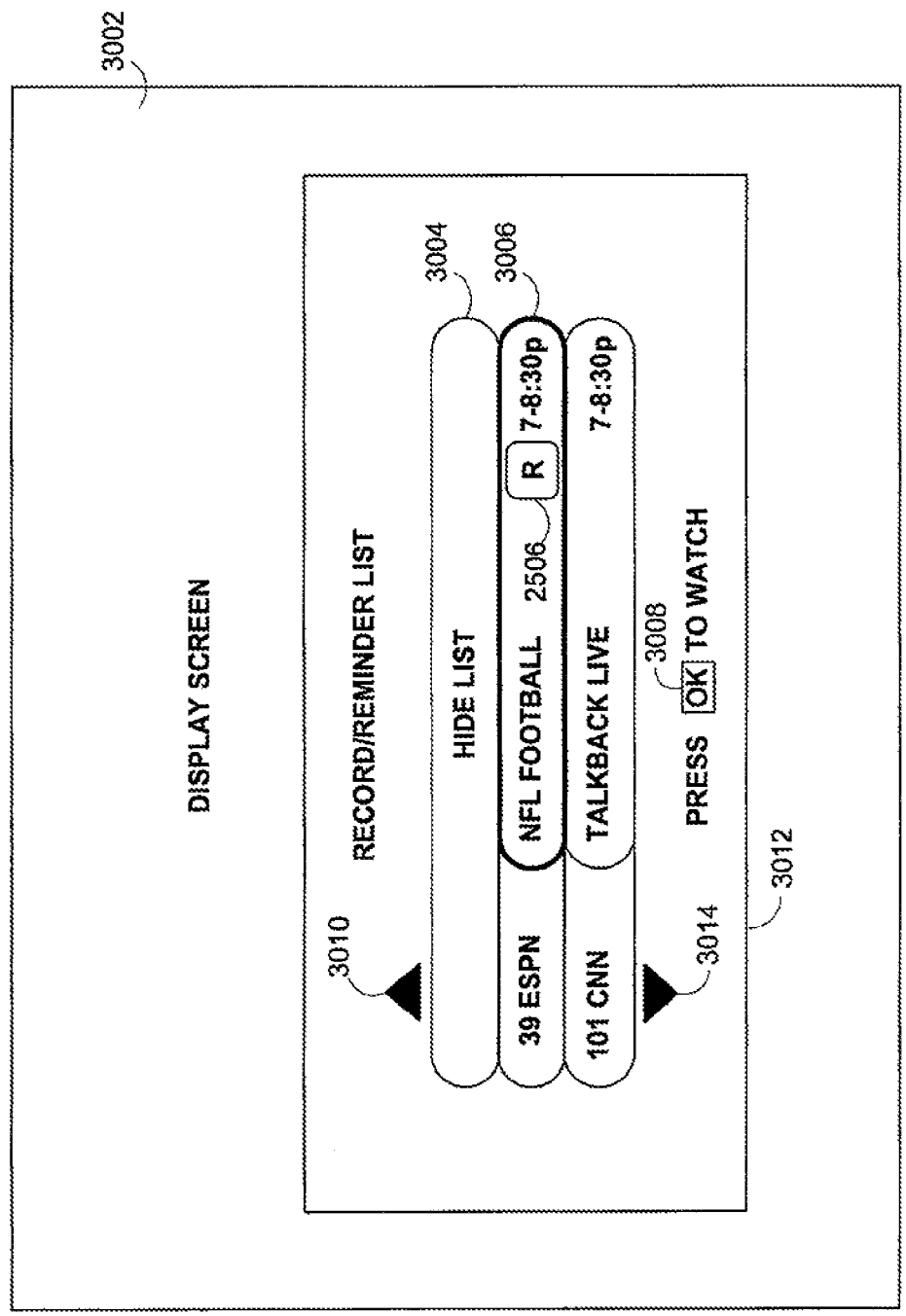
FIG. 30 shows an illustrative recording reminder display screen in accordance with the present invention.

FIG. 30 is an illustrative screen shot of a reminder feature. Video content may be presented on display screen 3002. The user may have previously indicated a desire to receive reminders while modifying the selectable options in the recording setup process 2400 or by some other technique. The IPG may have PVR extensions that may receive indication from a PVR device to provide record/reminder list 3012. In providing indication that a recording is scheduled to take place, the PVR device may use PVR APIs and a communications path to provide the IPG with PVR extensions the recording reminder indication. The IPG with PVR extensions may then present the reminder to the user. The recording reminder indication may be provided by the PVR device without a request or command sent from the IPG with PVR extensions to the PVR device. In some embodiments, the reminder list may be provided solely by the IPG without input from the PVR device.

In FIG. 30, reminder display screen 3002 is presented with a list of scheduled recordings 3006 and reminders. The user may select hide list option 3004 to hide the recording reminder list or highlight a program and press the OK key on the remote control to watch the program to be recorded or with a reminder. Upon receiving indication from the user to watch the scheduled program as it is recorded, the system may automatically tune in the channel on which the scheduled program is to be presented. Scrolling indicators 3010 and 3014 may again be provided to assist the user in navigating the recording reminder list. Program guides that provide reminders are illustratively described in Bennington et al. U.S. Pat. No. 6,331,877, which is hereby incorporated by reference herein in its entirety.

The foregoing is merely illustrative of the principles of this invention and various modifications may be made by those skilled in the art without departing from the scope and spirit of the invention. Those skilled in the art will appreciate that the present invention may be practiced by other than the described embodiments, which are presented for purposes of illustration and not of limitation, and the present invention is limited only by the claims.

What is claimed is:

1. A method for operating a personal video recorder compliant device, the method comprising:
    detecting, using a processor, a coupling of a personal video recorder device to the personal video recorder compliant device;
    determining, using the processor, a type of the personal video recorder device being used from a plurality of compatible types of personal video recorder devices based on information received from the personal video recorder device; and
    selecting, using the processor, a communication method for communicating with the personal video recorder device, from a plurality of available communication methods, based on the determined type of the personal video recorder device.

2. The method of claim 1 wherein the determining the type of personal video recorder device being used compromises using a handshake protocol to request and receive the information from the personal video recorder device.

3. The method of claim 1 wherein the determining the type of personal video recorder device being used compromises using application programming interfaces to interpret in the information received from the personal video recorder device.

4. The method of claim 3 wherein the application programming interfaces include routines.

5. The method of claim 1 wherein the type of personal video recorder device comprises at least one of a model and a manufacturer of the personal video recorder device.

6. A non-transitory machine readable medium for a personal video recorder compliant device, the non-transitory machine readable medium having machine program logic recorded thereon for:
    detecting, using a processor, a coupling of a personal video recorder device to the personal video recorder compliant device;
    determining, using the processor, a type of the personal video recorder device being used from a plurality of compatible types of personal video recorder devices based on information received from the personal video recorder device; and
    selecting, using the processor, a communication method for communicating with the personal video recorder device, from a plurality of available communication methods, based on the determined type of the personal video recorder device.

7. The non-transitory machine readable medium of claim 6 wherein the type of personal video recorder device comprises at least one of a model and a manufacturer of the personal video recorder device.

8. The non-transitory machine readable medium of claim 6 wherein the determining the type of personal video recorder device being used compromises using application programming interfaces to interpret in the information received from the personal video recorder device.

9. The non-transitory machine readable medium of claim 8 wherein the application programming interfaces include routines.

10. A personal video recorder compliant device, comprising:
    a processor configured to:
        detect a coupling of a personal video recorder device to the personal video recorder compliant device;
        determine a type of the personal video recorder device being used from a plurality of compatible types of personal video recorder devices based on information received from the personal video recorder device; and
        select a communication method for communicating with the personal video recorder device, from a plurality of available communication methods, based on the determined type of the personal video recorder device.

11. The system of claim 10 wherein the type of personal video recorder device comprises at least one of a model and a manufacturer of the personal video recorder device.

12. The system of claim 10 wherein determining the type of personal video recorder device being used compromises using application programming interfaces to interpret the information received from the personal video recorder device.

13. The system of claim 12 wherein the application programming interfaces include routines.

* * * * *